US005914150A

United States Patent [19]
Porter et al.

[11] Patent Number: 5,914,150
[45] Date of Patent: Jun. 22, 1999

[54] FORMATION OF POLYCARBONATE FILM WITH APERTURES DETERMINED BY ETCHING CHARGED-PARTICLE TRACKS

[75] Inventors: Jack D. Porter, Berkeley; Scott J. Crane, Prunedale; Stephanie J. Oberg, Sunnyvale; Anthony W. Johnson, Fremont; Christopher J. Spindt, Menlo Park; John M. Macaulay, Mountain View, all of Calif.

[73] Assignees: Candescent Technologies Corporation, San Jose; Hewlett-Packard Company, Palo Alto, both of Calif.

[21] Appl. No.: 08/807,456

[22] Filed: Feb. 28, 1997

[51] Int. Cl.⁶ ........................................ B05D 5/12
[52] U.S. Cl. ............................ 427/77; 427/64; 427/68; 427/162; 427/165; 427/240; 427/385.5; 213/13; 445/24
[58] Field of Search ................... 445/24, 50; 427/240, 427/243, 85.5, 162, 77, 66; 216/13, 68

[56] References Cited

U.S. PATENT DOCUMENTS

| 3,303,085 | 2/1967 | Price et al. | |
|---|---|---|---|
| 5,266,617 | 11/1993 | Han | 524/392 |
| 5,468,324 | 11/1995 | Hong | 156/247 |
| 5,559,389 | 9/1996 | Spindt et al. | 313/310 |
| 5,564,959 | 10/1996 | Spindt et al. | 445/24 |

FOREIGN PATENT DOCUMENTS

| WO 94/28569 | 12/1994 | WIPO . |
| WO 95/07543 | 3/1995 | WIPO . |

OTHER PUBLICATIONS

Apai et al, "Surface Analysis of Polycarbonate Thin Films by High–Resolution Electron Energy Loss Spectroscopy: Negative Ion Resonances and Surface Vibrations," *Langmuir*, vol. 7, 1991, pp. 2266–2272, (No Mo.).
Blunt et al, "Production of thin metallised plastic films," *Nucl. Instr. and Meth. in Phys. Res. A*, vol. 334, 19 pp. 251–253, (No Mo.).
Bosch, "A charge and energy study of the track response of Lexan," *Nucl. Instr. and Meth. in Phys. Res. B*, V 84, 1994, pp. 357–360, (No Mo.).
Bosch et al, "A study of the dependence of the bulk etch rate and the reduced etch rate on the concentration of etched products of Lexan," *Nucl. Instr. and Meth. in Phys. Res. B*, vol. 93, 1994, pp. 57–62, (No Mo.).
Busta, "Vacuum Microelectronics–1992," *J. Micromech. Microeng.* vol. 2, 1992, pp. 43–74, (No Mo.).
Cowie, *Polymers: Chemistry & Physics Of Modern Materials*, (2d ed., Blackie Academic & Professional), 1991 pp. 1–25,157–213, and 247–273, (No Mo.).
Fischer et al, "Production and use of nuclear tracks: imprinting structure on solids," *Reviews of Modern Physic* vol. 55, No. 4, Oct. 1983, pp. 907–948.
Hoffman, "Inorganic membrane filter for analytical separations," *American Laboratory*, Aug. 1989, pp. 70–73.

Hosokawa et al, "Bright blue electroluminescence from hole transporting polycarbonate," *Appl. Phys. Lett.*, vol. 61, No. 21, Nov. 23, 1992, pp. 2503–2505.
Huizenga, et al, "Submicron entrance window for an ultrasoft x–ray camera," *Rev. Sci. Instrum.*, vol. 52, No. 5, May 1981, pp. 673–677.
Kent, "EUV Band Pass Filters for the ROSAT Wide Field Camera," *Proceedings, SPIE*, vol. 1344, 1990, pp. 255–266, (No Mo.).
Nakamura et al, "Photocurrent of Solution–Grown Thin Polycarbonate Films Containing Soluble Nickel–Phthalcyanine," *Japanese Journal of Applied Physics*, vol. 28, No. 6, Jun. 1989, pp. 991–995.
Shriver et al, *The Manipulation of Air–Sensitive Compounds* (2d ed., John Wiley & Sons), 1986, pp. 84–96, (No Mo.).
Spohr, *Ion Tracks and Microtechnology, Principles and Applications* (Viewig), edited by K. Bethge, 1990, pp. 246–255, (No Mo.).
Stevens, *Polymer Chemistry, An Introduction*, (2d ed., Oxford University Press), 1990, pp. 28, 344, 345, 394, 395, and 400–403, (No Date).
Stoner, "Casting thin films of cellulose nitrate, polycarbonate, and polypropylene," *Nucl. Instr. and Meth. in Phys. Res. A*, vol. 362, 1995, pp. 167–174, (No Mo.).
Su, "Comparison of Chemical Etching with the Alkali–Alcohol Mixture and the Ultrasonic Etchings of Fission Fragment and Alpha Particle Tracks in Lexan Polycarbonates," *Radiation Effects and Defects in Solids*, vol. 11 1990, pp. 157–166, (No Mo.).
"Handling air–sensitive reagents," *Tech. Bull. AL–134*, Aldrich Chemical Co., Dec. 1994, 8 pages.
"Instruments for Research, Industry, and Education," catalog, Cole–Parmer Instrument Co., 1991–1992, pp. 663 665, 772, and 773, (No Mo).
1990 Nuclepore Laboratory Products Catalog, 1990, cover p. and pp. 3,8, and 9, (No Mo).
*The Condensed Chemical Dictionary* 10 Thed, Van Nostrand Rheinhold Co., N.Y., 1981. p. 872.

*Primary Examiner*—Janyce Bell
*Attorney, Agent, or Firm*—Skjerven, Morrill, MacPherson, Franklin & Friel LLP; Ronald J. Meetin

[57] ABSTRACT

A technique for creating openings in a polycarbonate film entails providing a liquid chemical formulation that contains polycarbonate material, a liquid that dissolves the polycarbonate, and possibly one or more other constituents. The liquid is typically capable of dissolving the polycarbonate to a concentration of at least 1% at 20° C. and 1 atmosphere. Examples of the liquid include pyridine, a ring-substituted pyridine derivative, pyrrole, a ring-substituted pyrrole derivative, pyrrolidine, a pyrrolidine derivative, chlorobenzene, and cyclohexanone. A liquid film (36A) of the chemical formulation is formed over a substructure (30) and processed to remove the liquid, thereby converting the liquid film into a solid polycarbonate track layer (38). Charged particles (70) are passed through the track layer to form charged-particle tracks (72) at least partway through the layer. Apertures (74) are created through the track layer by a process that entails etching along the tracks. The aperture-containing polycarbonate track layer is typically employed in fabricating a gated electron-emitting device.

37 Claims, 7 Drawing Sheets

FORMATION OF POLYCARBONATE FILM WITH APERTURES DETERMINED BY ETCHING CHARGED-PARTICLE TRACKS

CROSS REFERENCES TO RELATED APPLICATIONS

This is related to Porter et al., co-filed U.S. patent application Ser. No. 08/808,363, and to Brigham et al, co-filed U.S. patent application Ser. No. 08/808,364. To the extent not repeated herein, the contents of Ser. Nos. 08/808,363 and 08/808,364 are incorporated by reference herein.

FIELD OF USE

This invention relates to the formation of polycarbonate films, including the formation of apertures through polycarbonate films.

BACKGROUND ART

Polycarbonate is a colorless thermoplastic polymer, i.e., polycarbonate softens when heated and hardens when cooled. Polycarbonate is commonly used in applications which take advantage of its outstanding impact resistance and toughness, such as molded helmets, battery cases, bottles and packaging, and in applications which also demand optical transparency, such as bullet-proof and safety glass, eyewear, compact discs and automobile lenses. In thin-film form, polycarbonate is used for a variety of applications ranging from precision filters to electron-emitting devices.

Polycarbonate membranes used as commercial filters are described in the 1990 *Nucleopore® Laboratory Products Catalog,* Costar Corp., 1990, pp. 3, 8 and 9. The membranes are created by subjecting stretched, crystalline polycarbonate film to irradiation, followed by etching to form pores. The Costar process is similar to that disclosed in Price et al., U.S. Pat. No. 3,303,085. The thickness of commercial membrane filters is typically 6 to 11 $\mu$m.

Bassiere et al., PCT Patent Publication WO 94/28569, disclose how thin polycarbonate layers are used in manufacturing electron-emitting devices. In one embodiment, Bassiere et al. provide a polycarbonate layer over a sandwich consisting of an upper conductor, an insulator and a patterned lower conductor. The multi-layer structure is irradiated with heavy ions to create radiation tracks through the polycarbonate layer. The tracks are etched to form pores through the polycarbonate layer down to the upper conductor. Using suitable etchants, the pore pattern in the polycarbonate layer is transferred to the upper conductor and then to the insulator, after which conical electron-emissive elements are formed in the resulting openings in the insulator.

Bassiere et al. indicate that the thickness of their polycarbonate layer is approximately 2 $\mu$m. This is significantly less than the thickness of the commercial polycarbonate membrane filters in the Costar product catalog. While Bassiere et al. specify that the polycarbonate layer in their structure can be created by spin coating, Bassiere et al. do not provide any further information on how to make the polycarbonate layer.

Macaulay et al., PCT Patent Publication WO 95/07543, disclose a similar fabrication technique in which electron-emissive features in an electron-emitting device are defined by way of charged-particle tracks formed in a track layer. Polycarbonate is one of the materials that Macaulay et al. consider for the track layer. The thickness of the track layer in Macaulay et al. is 0.1 to 2 $\mu$m, typically 1 $\mu$m. Consequently, the thickness of the track layer in Macaulay et al. is typically less than that of the polycarbonate layer in Bassiere et al. by a factor of up to twenty.

As film thickness is reduced, it becomes progressively more difficult to make high-quality polycarbonate films. Controlling and maintaining the uniformity of film thickness and other properties, such as density, becomes harder. Structural and compositional defects also become more problematic in very thin polycarbonate films. It would be desirable to have a process (a) for creating a thin polycarbonate film whose thickness is highly uniform and (b) for providing small parallel apertures through the film, especially for use in defining openings in the gate layer of a gated electron emitter.

GENERAL DISCLOSURE OF THE INVENTION

The present invention furnishes such a process. Specifically, compositions are provided for a liquid chemical formulation, containing polycarbonate material and a polycarbonate-dissolving liquid, suitable for making a thin polycarbonate film that functions as a track layer through which small apertures are created by etching along substantially parallel charged-particle tracks. The aperture-containing polycarbonate track layer is typically used in fabricating a gated electron-emitting device.

In one aspect of the invention, the solubility of the polycarbonate material in the polycarbonate-dissolving liquid is 1% by mass at a temperature of 20° C. and a pressure of 1 atmosphere. In other words, at least 1% of the polycarbonate by mass is dissolvable in the liquid at 20° C. and 1 atmosphere. The polycarbonate-dissolving liquid preferably has a boiling point of at least 80° C.

In another aspect of the invention, the polycarbonate-dissolving liquid is constituted primarily with one or more of pyridine, a ring-substituted pyridine derivative, pyrrole, a ring-substituted pyrrole derivative, pyrrolidine, a pyrrolidine derivative, chlorobenzene and cyclohexanone. When so constituted, the liquid preferably has the solubility and minimum boiling-point properties prescribed for the first-mentioned aspect of the invention.

A liquid film of the present polycarbonate-containing liquid chemical formulation is formed over a substructure in both aspects of the invention. The liquid film is then converted into a solid polycarbonate track layer by removing the polycarbonate-dissolving liquid (and any other volatile materials) from the liquid film. The polycarbonate track layer is subjected to charged particles to form charged-particle tracks at least partway through the track layer. Corresponding apertures are subsequently created at least partway through, typically all the way through, the track layer by etching along the charged-particle tracks.

In a typical application, an electrically non-insulating layer of the substructure is etched through the apertures in the track layer to form corresponding openings in the non-insulating layer. The openings in the non-insulating layer can then be used to define locations for electron-emissive elements in an electron emitter.

For example, the non-insulating layer can be a gate layer that overlies an electrically insulating layer below which there is a lower electrically non-insulating emitter region. The insulating layer is etched through the openings in the gate layer (or electrode) to form corresponding dielectric open spaces in the insulating layer. Electron-emissive elements that contact the lower emitter region are then formed in the dielectric open spaces. The electron-emissive elements can take various shapes such as cones or filaments.

The thickness of the polycarbonate track layer produced in accordance with the invention's teachings is highly uniform. For example, comparing thicknesses at any two points on a track layer separated by up to 10 cm, the total percentage deviation in thickness from a perfectly uniform film is normally less than 10% (i.e., less than ±5%) and is typically less than 5% (i.e., less than ±2.5%) across the area of the track layer for thicknesses in the range of 0.1 to 2 $\mu$m. As a consequence, the size of the gate openings created by using the aperture-containing polycarbonate track layer varies little from opening to opening. The emission of electrons across the electron-emitting area of the electron emitter is quite uniform. The invention thus provides a high quality electron-emitting device.

BRIEF DESCRIPTION OF THE DRAWINGS

FIG. 1a presents data at 20° C. for pure solutions of two polycarbonates of different molecular weight dissolved in dry pyridine. FIG. 1b presents data at 20° C. for pure solutions of one polycarbonate dissolved in two different solvents.

Like reference symbols are employed in the drawings and in the description of the preferred embodiments to represent the same, or very similar, item or items.

DESCRIPTION OF THE PREFERRED EMBODIMENTS

General Considerations

Figure 1A:
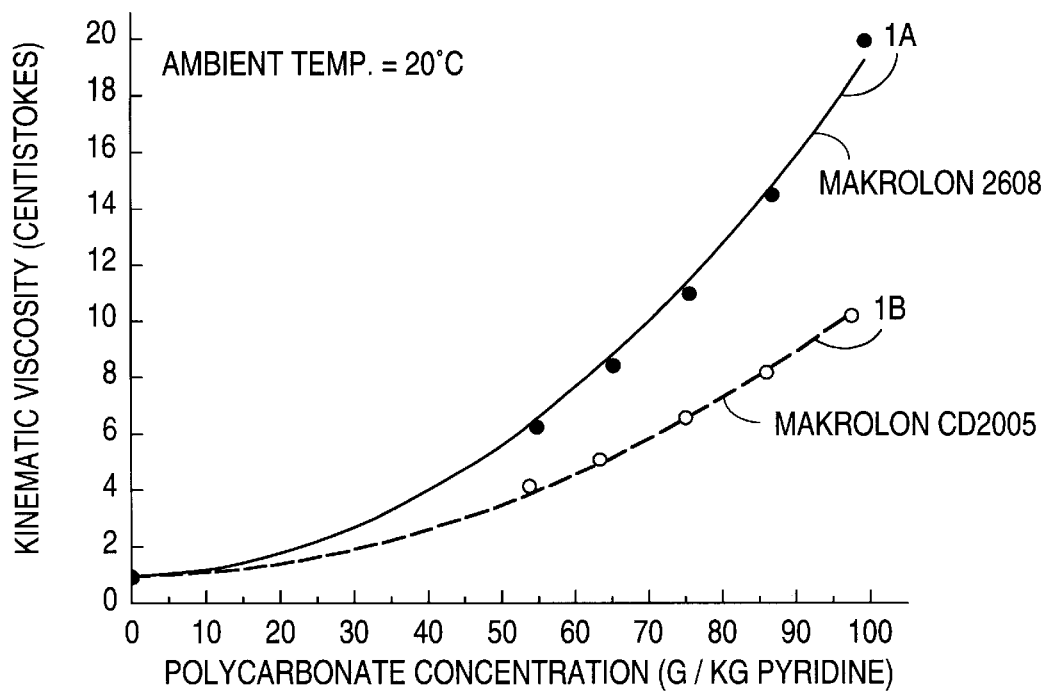
FIGS. 1a and 1b are graphs which illustrate kinematic viscosity of polycarbonate-containing solutions as a function of polycarbonate concentration.

The present invention utilizes a special polycarbonate-containing liquid chemical formulation for creating a polycarbonate track layer through which apertures are formed according to a charged-particle track etching process in creating electron-emissive elements for a gated field-emission cathode. The field emitter is suitable for exciting phosphor regions on a faceplate in a cathode-ray ("CRT") tube of a flat-panel device such as a flat-panel television or a flat-panel video monitor for a personal computer, a lap-top computer, or a workstation.

In the following description, the term "electrically insulating" (or "dielectric") generally applies to materials having a resistivity greater than $10^{10}$ ohm-cm. The term "electrically non-insulating" thus refers to materials having a resistivity below $10^{10}$ ohm-cm. Electrically non-insulating materials are divided into (a) electrically conductive materials for which the resistivity is less than 1 ohm-cm and (b) electrically resistive materials for which the resistivity is in the range of 1 ohm-cm to $10^{10}$ ohm-cm. These categories are determined at an electric field of no more than 1 volt/$\mu$m.

Examples of electrically conductive materials (or electrical conductors) are metals, metal-semiconductor compounds (such as metal silicides), and metal-semiconductor eutectics. Electrically conductive materials also include semiconductors doped (n-type or p-type) to a moderate or high level. Electrically resistive materials include intrinsic and lightly doped (n-type or p-type) semiconductors. Further examples of electrically resistive materials are (a) metal-insulator composites, such as cermet (ceramic with embedded metal particles), (b) forms of carbon such as graphite, amorphous carbon, and modified (e.g. doped or laser-modified) diamond, (c) and certain silicon-carbon compounds such as silicon-carbon-nitrogen.

The present liquid chemical formulation consists of polycarbonate material, a liquid that dissolves the polycarbonate material and one or more other constituents that may be liquid or solid in standard form (i.e., at standard temperature and pressure). The liquid used for dissolving the polycarbonate in the present liquid chemical formulation is often termed the "polycarbonate solvent" herein. When formed according to the invention's teaching using appropriate polycarbonate solvent, the polycarbonate-containing liquid chemical formulation yields a polycarbonate track layer or film whose thickness is substantially constant, ranging in value from 0.1 to 2 $\mu$m. In comparing film thicknesses at any two points separated by up to 10 cm on a planar substructure, the total percentage deviation in thickness from a perfectly uniform film is less than 10%, i.e., less than ±5% from the average thickness.

The composition and density of the polycarbonate track film, typically transparent, are normally as uniform as the film thickness. Consequently, the optical properties of such a transparent polycarbonate film also meet similar uniformity criteria. For an optically transparent polycarbonate film, optical quantities defined by the complex refractive index are uniform within similar tolerances.

The manufacture of a thin polycarbonate film through which apertures are formed according to the invention normally entails forming a liquid film of the present liquid chemical formulation over a substructure and removing the polycarbonate solvent and any other volatile components from the polycarbonate-containing liquid film. The non-volatile components of the original liquid formulation and any non-volatile reaction products of the original liquid formulation components then form the solid polycarbonate track film.

Film Criteria and Constituents

Various process-related factors are important in meeting the thickness and uniformity criteria prescribed above for the polycarbonate film. To achieve the requisite thickness uniformity, the polycarbonate-containing liquid film is formed on the substructure using a method, typically spin coating, which enables the liquid film to have approximately the same uniformity as that of the final solid polycarbonate film. Spin coating can be controlled with sufficient precision for this purpose, being dependent primarily upon the solution viscosity, the angular velocity and angular acceleration of the substructure, and the length of time the substructure is spun.

When the liquid film is formed by spin coating, the kinematic viscosity of the polycarbonate-containing liquid chemical formulation of the invention is no more than 100 centistokes at a temperature of 20° C. and a pressure of 1 atmosphere, where 1 centistoke equals $1 \times 10^{-6}$ m$^2$/s and 1 atmosphere equals 101,325 Pa. Normally, the kinematic viscosity of the liquid formulation at 20° C. and 1 atmosphere is in the range of 2 to 25 centistokes for spin coating applications. When spin coating is used to create the liquid film, the rotation speed can be varied usefully from as little as 100 revolutions per minute ("rpm") to as much as 8,000 rpm. For a preferred rotation speed in the range of 1,000 to 3,000 rpm, the preferred kinematic viscosity of the liquid formulation lies in the range 8 to 12 centistokes at 20° C. and 1 atmosphere.

To attain good quality polycarbonate films, the percentage of water in the liquid chemical formulation should be quite low. In particular, the liquid formulation should have no more than 1% water by mass of the liquid formulation, preferably no more than 0.1%. The mass percentage of water in the liquid formulation is typically on the order of 0.01% or less. A high concentration of water in the liquid formulation causes precipitation of the polycarbonate material, which can lead to the formation of poor-quality polycarbonate films. A high water concentration also causes generally undesired hydrolysis of the polycarbonate. Hydrolysis results in a change in the mean molecular weight of the polycarbonate dissolved in liquid formulation.

The liquid chemical formulation of the invention has the following broad properties:

1a. Aside from the polycarbonate solvent (i.e., the liquid employed to dissolve the polycarbonate), the principal constituent of the liquid formulation is polycarbonate having a molecular weight of at least 10,000. The molecular weight of the polycarbonate is usually at least 20,000 and is normally no more than 100,000. Preferably, the molecular weight of the polycarbonate is 30,000 to 35,000.

The higher the molecular weight of the polycarbonate, the higher the kinematic viscosity of the liquid chemical formulation for a given concentration of polycarbonate. This relationship is illustrated in FIG. 1a in which the kinematic viscosity for experimental polycarbonate-containing solutions is plotted as a function of the mass concentration of polycarbonate in the solution for polycarbonates of two different molecular weights.

In particular, FIG. 1a presents data obtained at 20° C. for pure solutions of: (1A) MAKROLON® 2608 polycarbonate (specifically MAKROLON 2608-1000N polycarbonate) having a molecular weight of approximately 33,000 and (1B) MAKROLON CD2005 polycarbonate having a molecular weight of approximately 18,000. Both polycarbonate polymers, made by Bayer, were dissolved in dry pyridine, i.e., pyridine processed to reduce the water content to a very low level, typically no more than 0.01% by mass. FIG. 1a also illustrates, as expected, that the kinematic viscosity increases non-linearly with increasing polycarbonate concentration in pyridine.

Figure 1B:
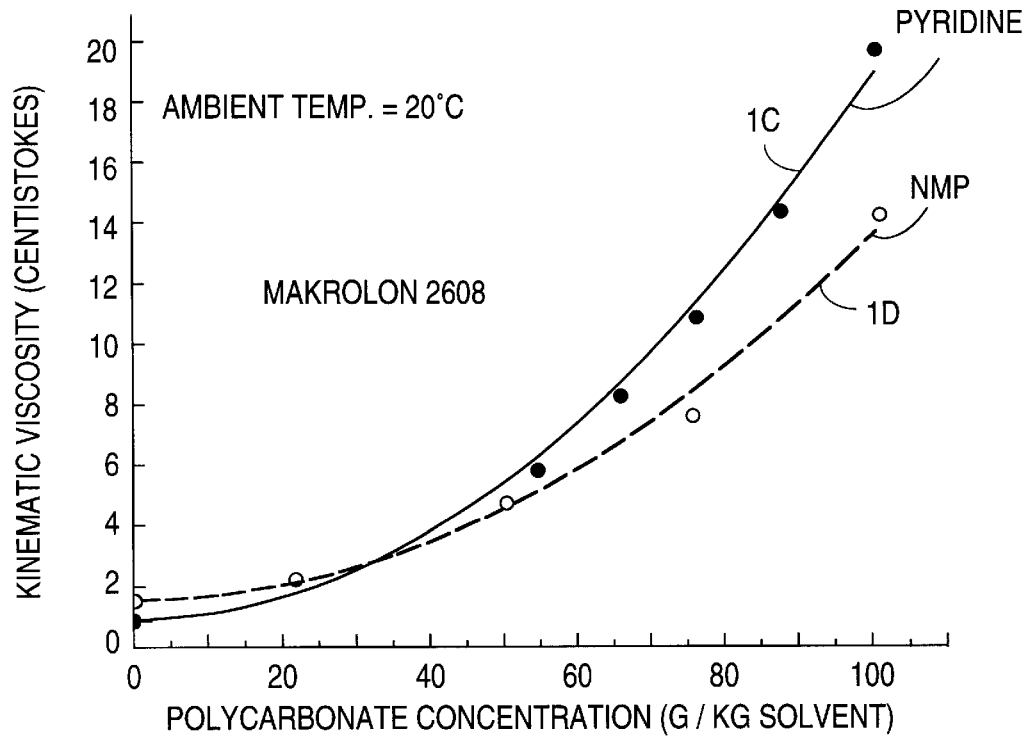

Similar variations of kinematic viscosity with polycarbonate concentration occur with other polycarbonate solvents. This is illustrated in FIG. 1b by way of kinematic viscosity/polycarbonate mass concentration data obtained at 20° C. for pure solutions of MAKROLON 2608 polycarbonate dissolved in: (1C) pyridine and (1D) 1-methylpyrrolidinone commonly known as NMP. As with the solutions represented by the data in FIG. 1a, the solvents used in generating the data in FIG. 1b were processed to reduce the water content to a very low level.

The data in FIGS. 1a and 1b are described well by a simple, approximate, semi-empirical model of polymer solvation in a "good" solvent, i.e., a solvent in which solute-solvent interactions are strong enough to partly uncoil the polymer chains in solution and permit relatively-free motion of the chains. The curves in FIGS. 1a and 1b were fitted to the data by least-squares regression and are described by the following variation of the Einstein equation:

$$v = v_o + ac^2 \tag{1}$$

where v is the kinematic viscosity of the solution, $v_o$ is the kinematic viscosity of the pure solvent, a is a constant which depends upon the chemical composition of the polycarbonate, upon its molecular weight and upon the identity of the solvent, and c is the concentration of polycarbonate. As FIGS. 1a and 1b make clear, the preferred ranges of polycarbonate concentration and kinematic viscosity can be achieved by preparing chemical solutions which contain polycarbonates within the specified range of molecular weight.

1b. The glass transition temperature $T_g$ of the polycarbonate is normally at least 65° C. In the process of removing the polycarbonate solvent and other volatile components from the liquid film created from the polycarbonate-containing liquid chemical formulation of the invention, the resulting polycarbonate film would be formed in an undesirable rubbery or molten state if the film temperature were more than approximately 15° C. above the polycarbonate glass transition temperature $T_g$ at the end of the polycarbonate solvent removal process. Unacceptable variations in film thickness would occur as the rubbery-to-molten polycarbonate film is cooled down to form a solid hard film.

In light of this, the 65° C. minimum $T_g$ value for the polycarbonate is derived from the specifications, described further below, that the boiling point $T_b$(1 atm) of the polycarbonate solvent at 1 atmosphere be at least 80° C. to avoid having the polycarbonate solvent evaporate too quickly at an ambient temperature $T_{amb}$ in the vicinity of 20° C. and that the intermediate liquid film be capable of being dried under 1-atmosphere conditions at a temperature as low as the 1-atmosphere boiling point $T_b$(1 atm) of the polycarbonate solvent in order to achieve a drying time short enough to be commercially acceptable while simultaneously avoiding undesirable thickness variations in the solid polycarbonate film due, for example, to a need for excessively high temperature at the end of the drying procedure.

The glass transition temperature $T_g$ of the polycarbonate is typically in the range of 120–170° C. $T_g$ for MAKROLON 2608 polycarbonate is 145±2° C.

1c. The polycarbonate material is substantially water-free (anhydrous) immediately prior to being dissolved in the polycarbonate solvent during the preparation of the liquid chemical formulation. In particular, the polycarbonate contains no more than 0.1% water by mass, preferably less than 0.01%. If the polycarbonate initially contains a higher mass percentage of water, the polycarbonate is suitably dried to reduce the water content below this value. The higher the water content of the polycarbonate, the higher the water content of the liquid formulation prepared from it.

1d. The liquid chemical formulation may include a surfactant, i.e., a soap-like material which exhibits a positive surface-excess concentration in the liquid formulation of the invention. The surfactant decreases the contact angle between the liquid formulation and the substructure, thereby improving the wetting of the substructure by the liquid formulation. The surfactant may be in liquid or solid form prior to being introduced into the polycarbonate solvent. If the surfactant is non-volatile, it will remain as a minor component of the solid polycarbonate film after the liquid film is processed to remove volatile components. The surfactant may or may not exhibit a positive surface-excess concentration in the solid polycarbonate film.

1e. The liquid chemical formulation may include an adhesive or adhesion promoter, i.e., a material which increases the energy per unit area necessary to separate the polycarbonate film from the substructure. As with the surfactant, the adhesive or adhesion promoter may be in liquid or solid form prior to being introduced into the polycarbonate solvent. If the adhesive or adhesion promoter is non-volatile, it likewise remains as a minor component of the solid polycarbonate film after the liquid film is processed to remove volatile components. The adhesive or adhesion promoter may also react with the substructure and/or the polycarbonate film at the substructure/film interface, leaving non-volatile products which form part of the polycarbonate film.

1f. The liquid chemical formulation may include a dye that dissolves in the polycarbonate solvent. The soluble dye may likewise remain as part of the solid polycarbonate film after processing the liquid film to remove volatile components.

The polycarbonate in the liquid chemical formulation of the invention can be chemically represented by the polymer formula:

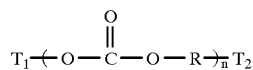

(2)

where O represents an oxygen atom, C represents a carbon atom, R represents a bivalent group, each connecting line represents a single covalent chemical bond, and plural integer n is the number of repetitions of the monomeric repeating unit, represented as the segment within the parentheses in formula 2. Standard polycarbonate terminating groups $T_1$ and $T_2$ are present at both ends of the polymer chain. The "core" of the polymer molecule is the segment of n monomeric repeating groups falling between terminating groups $T_1$ and $T_2$.

Each of terminating groups $T_1$ and $T_2$ is typically a methoxy ($CH_3O$), ethoxy ($C_2H_5O$), T-butyl ($C_4H_9O$) group, or an acetyloxy ("AcO") group where the termination link is made through the oxygen atom. $T_1$ and $T_2$ can also be ester groups that, for example, include aliphatic alcohols. Repetition integer n is normally at least 10, typically at least 100. The molecular weight of the polycarbonate increases linearly with increasing n.

In formula 2, bivalent group R is typically configured as:

(3)

where each of $\phi_A$ and $\phi_B$ represents a phenylene group or a ring-substituted phenylene group, and X is typically an alkylene group but can be an ether group, a sulfide group or a sulfone group. For the specific case in which X is an alkylene group, formula 3 for bivalent group R can be modified to give R as:

(4)

where each of $R_A$ and $R_B$ represents a hydrogen or deuterium atom, or a monovalent hydrocarbon group. When at least one of $R_A$ and $R_B$ is an alkylene group, the number of carbon atoms in the alkylene group typically varies from one to four.

A preferred form of the polycarbonate is poly(bisphenol A carbonate), in which $\phi_A$ and $\phi_B$ are both unsubstituted 1,4-phenylene groups and $R_A$ and $R_B$ are both methyl groups. In this case, the polymeric core of the polycarbonate is:

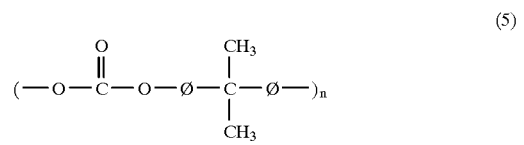

(5)

where H represents a hydrogen atom, $CH_3$ represents a methyl group, and $\phi$ represents an unsubstituted 1,4-phenylene group.

The preferred polycarbonate in formula 5 is usually a MAKROLON polycarbonate made by Bayer. Preferably, the MAKROLON polycarbonate is MAKROLON 2608, whose molecular weight is approximately 33,000. For MAKROLON 2608, the number n of repeating units is approximately 125.

A surfactant is present in the preferred formulation of the present liquid chemical formulation for the reasons outlined previously. The preferred surfactant is Fluorad™ FC-430 surfactant, a viscous liquid mixture of fluoroaliphatic polymeric esters made by Minnesota Manufacturing and Mining Co. and present at a concentration sufficient to act as a wetting agent. The concentration of Fluorad FC-430 surfactant in the liquid chemical formulation is 0.001–1 g surfactant/kg polycarbonate solvent, typically 0.22 g surfactant/kg polycarbonate solvent.

Polycarbonate Solvent Criteria and Constituents

The polycarbonate solvent is capable of dissolving sufficient polycarbonate to achieve a final polycarbonate film thickness between 0.1 and 2 μm, and a final thickness uniformity better than 10% (±5%), preferably better than 5% (±2.5%), for thicknesses measured at points on a planar substructure separated by up to 10 cm. For this purpose, the solubility of polycarbonate in the solvent is normally at least 1% by mass of the liquid chemical formulation at 20° C. and 1 atmosphere, but may be as low as 0.5%. The solvent is preferably capable of dissolving at least 5% polycarbonate by mass at 20° C. and 1 atmosphere.

The liquid chemical formulation solution normally contains no more than 50% polycarbonate by mass of the liquid formulation when spin coating is used to make polycarbonate films. Liquid formulations with high polycarbonate concentration, e.g., greater than 50% by mass, can exhibit viscous fingering and slow surface wetting during spin coating, thereby yielding polycarbonate films of poorer uniformity in their physical properties. The percentage of polycarbonate in liquid formulations used for spin coating is typically no more than 20% by mass. The polycarbonate concentration ranges of 1% to 10% by mass, preferably 5% to 10% by mass, are especially useful for the formation of polycarbonate films of final thickness between 0.1 and 2 μm by spin coating.

In addition to the solubility requirements outlined above, the polycarbonate solvent has the following properties:

2a. The melting point $T_m(1\ \text{atm})$ of the solvent at 1 atmosphere is less than 20° C. Typically, the ambient temperature $T_{amb}$ at which the liquid chemical formulation is coated onto the substructure in the process of making the polycarbonate film is approximately 20° C. Consequently, the condition that $T_m(1\ \text{atm})$ be less than $T_{amb}$ ensures that the liquid chemical formulation of the invention is indeed a liquid at the conditions specified.

2b. The boiling point $T_b(1\ \text{atm})$ of the polycarbonate solvent at 1 atmosphere is at least 80° C. As a result, $T_b(1\ \text{atm})$ of the solvent is normally greater than or equal to $(T_{abm}+60°\ \text{C.})$. This ensures that the rate of evaporation of the polycarbonate solvent from the liquid chemical formulation is sufficiently low at the ambient temperature $T_{amb}$ to permit the formation of a uniform liquid film of the formulation over the substructure in the process of making the polycarbonate film.

2c. The boiling point $T_b(0.001\ \text{atm})$ of the polycarbonate solvent at 0.001 atmosphere is less than or equal to $(T_g+15°\ \text{C.})$, where $T_g$ is the glass transition temperature of the polycarbonate, and 0.001 atmosphere is the lowest pressure to which the polycarbonate-containing liquid film is typically subjected by the manufacturing equipment employed in processing the liquid film to form a solid polycarbonate film according to the invention.

The viscosity of a polycarbonate film decreases precipitously as the film temperature increases from approximately 15° C. above the polycarbonate glass transition temperature $T_g$ to increasingly higher values, causing the film to go from a hard state (at no more than approximately 15° C. above $T_g$) to a rubbery state (at slightly more than 15° C. above $T_g$) and then to a molten state (at considerably more than 15° C. above $T_g$). At such elevated temperature, the polycarbonate film flows under the influence of gravity, the geometry of the structure underlying the film, and the composition of the underlying substructure. Film thickness variations which are unacceptably high for many commercial applications are produced in the flowing film and remain in the film after it is cooled down to a hardened state.

Setting $T_b(0.001\ \text{atm})$ at no more than $(T_g+15°\ \text{C.})$ enables the liquid film to be dried under 0.001-atmosphere conditions at a temperature as high as $T_b(0.001\ \text{atm})$ without significantly changing the thickness uniformity of the polycarbonate film during the drying procedure. Hence, the polycarbonate solvent can be evaporatively removed from the uniform liquid film at the condition of highest temperature and lowest pressure typically encountered in processing of the liquid film to form the solid polycarbonate film.

Figure 2:
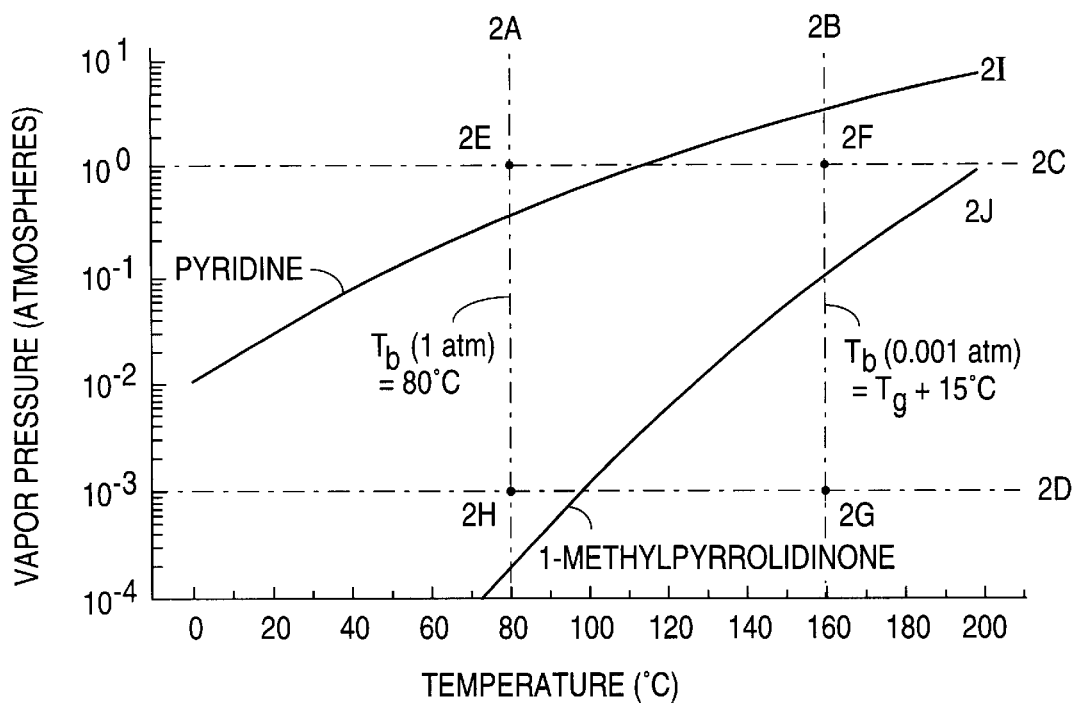
FIG. 2 is a graph of vapor pressure, plotted logarithmically as a function of temperature, for two different polycarbonate solvents which conform to the criteria outlined below and which are suitable for making a polycarbonate-containing liquid chemical formulation for use in accordance with the invention.

FIG. 2 summarizes conditions 2b and 2c graphically by plotting the vapor pressure of pure polycarbonate solvent logarithmically as a function of temperature. Specifically, condition 2b relates to point 2E, and condition 2c relates to point 2G. Line 2A at 80° C. is the low-temperature limit for the boiling point $T_b(1\ \text{atm})$ of the solvent at 1 atmosphere given in condition b. Line 2B at 160° C. is the high-temperature limit for the boiling point $T_b(0.001\ \text{atm})$ of the solvent at 0.001 atmosphere, given in condition 2c, for the specific case of MAKROLON 2608 polycarbonate whose glass transition temperature $T_g$ is approximately 145° C. Line 2C denotes 1 atmosphere, the typical ambient pressure at which the solution of the invention is coated onto a substructure. Line 2D denotes 0.001 atmosphere, the lowest pressure typically encountered during the processing of the liquid film to form the solid polycarbonate film of the invention.

Line 2I is a plot of the vapor pressure curve for pure pyridine, and line 2J is a plot of the vapor pressure curve for pure 1-methylpyrrolidinone (NMP). With reference to FIG. 2, conditions 2b and 2c are satisfied by solvents whose vapor pressure curves cross the rectangular area {2E 2F 2G 2H}. Curves 2I and 2J satisfy this criterion. Both pyridine and 1-methylpyrrolidinone thus are suitable polycarbonate solvents for use in forming the liquid chemical formulation of the invention, as discussed further below, for this criterion.

2d. The polycarbonate solvent does not polymerize or chemically react with the polycarbonate material at a significant rate.

2e. The polycarbonate solvent is substantially water-free. Preferably, the solvent contains no more than 0.1% water by mass. If the solvent initially contains a higher percentage of water, the solvent is suitably dried to reduce the percentage of water to an appropriately low level.

2f. The polycarbonate solvent does not significantly promote or catalyze chemical reactions between the polycarbonate and other constituents of the liquid chemical formulation, such as water.

2g. The polycarbonate solvent does not react with water in the liquid chemical formulation to form significant concentrations of hydroxide ion, OH$^-$. In other words, the solvent is a relatively weak Bronsted base compared to hydroxide ion. When present in the liquid formulation of the invention, hydroxide ion reacts with the polycarbonate, resulting in scission of the polymer molecule and a decrease in the mean molecular weight of the polycarbonate.

Reaction of a solvent with water to form hydroxide ion is a conventional Bronsted acid-base reaction:

$$B+H_2O \leftrightharpoons BH^+ + OH^- \qquad (6)$$

where B represents the solvent acting as a Bronsted base. If the solvent is a relatively weak Bronsted base compared to hydroxide ion, the solvent is also a weak Bronsted base in aqueous solution. Equivalently stated, the protonated form of the solvent molecule BH$^+$ is a weak Bronsted acid in aqueous solution.

The preferred upper limit for the concentration of hydroxide ion in the polycarbonate-containing liquid chemical formulation of the invention is approximately $10^{-3}$ mol/dm$^3$, i.e., 1 mM. Given the limits described previously for water concentration in the liquid formulation, it follows that the protonated form of the solvent should have an acid dissociation constant $K_a(BH^+)$ in aqueous solution greater than $10^{-8}$ at 20° C. $K_a(BH^+)$ is the thermodynamic equilibrium constant for the reaction:

$$BH^+ + H_2O \rightleftharpoons H_3O^+ + B \qquad (7)$$

The higher the concentration of hydroxide ion in the chemical liquid formulation of the invention, the shorter will be the effective shelf life of the liquid formulation.

2h. The polycarbonate solvent does not substantially chemically or physically alter the substructure onto which the liquid chemical formulation is coated.

2i. The polycarbonate solvent is non-pyrophoric, i.e., it does not ignite spontaneously upon exposure to air. The solvent should not oxidize to a significant extent when exposed to air.

2j. The polycarbonate solvent may itself include a surfactant component to improve the wetting characteristics of the liquid chemical formulation on the substructure. The surfactant component of the solvent should conform to the reactivity and composition conditions 2d to 2i given above.

The polycarbonate solvent typically consists primarily of pyridine, a liquid which meets the polycarbonate solubility requirements given above. Pyridine can dissolve considerably more than 10% polycarbonate by mass at 20° C. and 1 atmosphere. For example, the solubility of a MAKROLON polycarbonate such as MAKROLON 2608 can exceed 40% by mass in pyridine at 20° C. and 1 atmosphere.

The melting point $T_m(1\text{ atm})$ of pyridine at 1 atmosphere is approximately −42° C. This is less than 20° C., thereby enabling pyridine to meet condition 2a above. The boiling point $T_b(1\text{ atm})$ of pyridine at 1 atmosphere is approximately 115° C., which is greater than 80° C., as specified in condition 2b above. The boiling point $T_b(0.001\text{ atm})$ of pyridine at 0.001 atmosphere is approximately 5° C. This is less than the 160° C. value of $(T_g+15°\text{ C.})$ for MAKROLON 2608 polycarbonate, thereby satisfying condition 2c above for MAKROLON 2608.

Pyridine is a nucleophile and thus can react with electrophilic moieties in polycarbonate to catalyze polycarbonate hydrolysis. However, the rates of these reactions are insignificant, and the extent of reaction is insignificant over time scales of months at the typical ambient temperature of 20° C., provided the water content of the liquid chemical formulation is sufficiently low. Storing the liquid chemical formulation of the invention at temperatures lower than 20° C. increases the shelf life of the liquid formulation.

Pyridine can be dried by standard methods to water concentrations less than 0.001% by mass. Although hygroscopic, pyridine is typically treated and handled in such a manner in the invention for the percentage of water in the composition solution to be less than 0.01% by mass.

The acid dissociation constant $K_a$ of protonated pyridine (the pyridinium ion) in aqueous solution at 20° C. is approximately $6 \times 10^{-6}$. Hence, pyridinium satisfies condition 2g that the acid dissociation constant of the protonated form of the polycarbonate solvent in aqueous solution be greater than $10^{-8}$ at 20° C.

Pyridine is not pyrophoric. It can be oxidized to form pyridine N-oxide. However, this reaction requires strong oxidizing agents, and the rates of air oxidation are insignificant at the typical ambient temperature of 20° C.

Pyridine is surface-active on many metals, semiconductors and insulators, typically acting as a corrosion inhibitor. Consequently, pyridine does not significantly alter the physical or chemical composition of many practical substructure materials.

The polycarbonate solvent may alternatively or additionally (i.e., in addition to what has previously been identified here for dissolving polycarbonate according to the invention's teachings) be formed with one or more ring-substituted pyridine derivatives (hereafter, for simplicity, generally referred to in the singular as a ring-substituted pyridine derivative). When a ring-substituted pyridine derivative is employed, the solvent likewise meets all the polycarbonate solvent criteria given above. Either pyridine or the ring-substituted pyridine derivative may be the primary constituent of the solvent when both constituents are present in the solvent.

Both pyridine and the ring-substituted pyridine derivative can be chemically represented as:

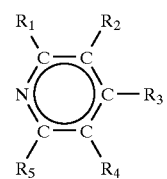

(8)

where N represents a nitrogen atom, and each of $R_1$, $R_2$, $R_3$, $R_4$ and $R_5$ represents a monovalent substituent bonded covalently to the aromatic ring. Each of $R_1$ to $R_5$ is typically a hydrogen atom, a deuterium atom, a monovalent hydrocarbon group, a monovalent substituted hydrocarbon group, an acetyl group, a carboxaldehyde group, a halogen atom, or a monovalent pseudo-halogen substituent. A substituted hydrocarbon group is a hydrocarbon group in which at least one of the hydrogen (or deuterium) atoms is replaced with another chemical species. For the monovalent hydrocarbon group, the number of carbon atoms for each of $R_1$ through $R_5$ normally ranges from one to four. The same range applies to the substituted monovalent hydrocarbon group.

Formula 8 yields pyridine when each of $R_1$ through $R_5$ is hydrogen or deuterium. The empirical formula for pyridine is $C_5H_5N$ in the fully hydrogen-substituted molecule. A ring-substituted pyridine derivative is produced when at least one of $R_1$ through $R_5$ in formula 8 is a substituent other than hydrogen or deuterium, preferably one from the above list.

Several types of ring-substituted pyridine derivatives are of special interest for use as the solvent. One type is the case in which one of $R_1$ to $R_5$ is an alkyl group, preferably having from one carbon atom (the picolines) to four carbon atoms. The remainder of $R_1$ through $R_5$ may consist of any of the monovalent covalent substituents given above, including hydrogen and deuterium.

A second type of pyridine derivative of special interest consists of those derivatives in which two adjacent substituent positions are taken up by a fused ring, i.e., a ring substituent which shares a carbon-carbon-bonded (non-nitrogen) edge with the pyridine ring. Two benz-fused examples of this type of pyridine derivatives are given below:

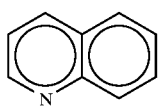

(9)

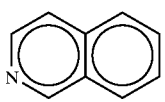

(10)

The intersection of two or more straight lines in a chemical formula such as formula 9 or 10 indicates the presence of a carbon atom.

In an aromatic fused-ring substituent, represented (for example) by the right hand ring in formula 9 or 10, each ring carbon outside the fused edge is covalently bonded to a monovalent substituent. In a non-aromatic fused-ring substituent, each ring carbon outside the fused edge is covalently bonded to a pair of monovalent substituents or to a bivalent substituent. Consequently, the ring substituent in a fused-ring substituent derivative of pyridine may itself be substituted. The remainder of the substituent positions may be taken up by one or more of the substituent groups listed above for $R_1$ through $R_5$ in formula 8. Examples of appropriate benz-fused derivatives of special interest are the substituted quinolines, formula 9, and the substituted isoquinolines, formula 10.

When at least one of $R_1$ through $R_5$ in formula 8 is a halogen atom, the halogen can be fluorine, chlorine, bromine or iodine, with fluorine or chlorine being preferred substituents. In the case of monovalent pseudo-halogen substituents, the substituent is typically a nitrile group.

Specifically, pyridine derivatives of interest for use as the polycarbonate solvent in the present liquid chemical formation include the liquids given in the following table:

TABLE 1

| Chemical Name | Empirical Formula | $T_b$(1 atm) (° C.) |
|---|---|---|
| 2-methylpyridine | $C_6H_7N$ | 128 |
| 3-methylpyridine | $C_6H_7N$ | 144 |
| 4-methylpyridine | $C_6H_7N$ | 145 |
| 2-ethylpyridine | $C_7H_9N$ | 149 |
| 3-ethylpyridine | $C_7H_9N$ | 165 |
| 4-ethylpyridine | $C_7H_9N$ | 168 |
| 2,3-dimethylpyridine | $C_7H_9N$ | 163 |
| 2,4-dimethylpyridine | $C_7H_9N$ | 159 |
| 2,5-dimethylpyridine | $C_7H_9N$ | 157 |
| 2,6-dimethylpyridine | $C_7H_9N$ | 146 |
| 3,4-dimethylpyridine | $C_7H_9N$ | 163–164 |
| 3,5-dimethylpyridine | $C_7H_9N$ | 172 |
| 2-ethyl-4-methylpyridine | $C_8H_{11}N$ | 173 |
| 2-ethyl-6-methylpyridine | $C_8H_{11}N$ | 160 |
| 3-ethyl-4-methylpyridine | $C_8H_{11}N$ | 198 |
| 4-ethyl-2-methylpyridine | $C_8H_{11}N$ | 179 |
| 5-ethyl-2-methylpyridine | $C_8H_{11}N$ | 178 |
| 2-isopropylpyridine | $C_8H_{11}N$ | 160 |
| 4-isopropylpyridine | $C_8H_{11}N$ | 178 |
| 2-n-propylpyridine | $C_8H_{11}N$ | 166–168 |
| 4-n-propylpyridine | $C_8H_{11}N$ | 184–186 |
| 2-(t-butyl)pyridine | $C_9H_{13}N$ | 170 |
| 4-(t-butyl)pyridine | $C_9H_{13}N$ | 196 |
| 2-(1-ethylpropyl)pyridine | $C_{10}H_{15}N$ | 195 |
| 2-phenylpyridine | $C_{11}H_9N$ | 270 |
| 3-phenylpyridine | $C_{11}H_9N$ | 273 |
| 4-phenylpyridine | $C_{11}H_9N$ | 280 |
| 2-benzylpyridine | $C_{12}H_{11}N$ | 276 |

TABLE 1-continued

| Chemical Name | Empirical Formula | $T_b$(1 atm) (° C.) |
|---|---|---|
| 2-methoxypyridine | $C_6H_7NO$ | 142 |
| 4-methoxypyridine | $C_6H_7NO$ | 191 |
| 2-hydroxypyridine | $C_6H_7NO$ | 113 |
| 3-hydroxypyridine | $C_6H_7NO$ | 154 |
| 2-(2-hydroxyethyl)pyridine | $C_7H_9NO$ | 113 |
| 2-chloropyridine | $C_5H_4ClN$ | 170 |
| 3-chloropyridine | $C_5H_4ClN$ | 148 |
| 4-chloropyridine | $C_5H_4ClN$ | 147 |
| 2-chloro-6-methoxypyridine | $C_6H_6ClNO$ | 185–186 |
| 2-bromopyridine | $C_5H_4BrN$ | 193 |
| 3-bromopyridine | $C_5H_4BrN$ | 173 |
| 2-fluoropyridine | $C_5H_4FN$ | 126 |
| 3-fluoropyridine | $C_5H_4FN$ | 106 |
| 2-iodopyridine | $C_5H_4IN$ | >93 |

In addition to satisfying condition 2b that the boiling point $T_b$(1 atm) of the polycarbonate solvent at 1 atmosphere be at least 80° C. as indicated by the boiling point data given in Table 1, all of the preceding pyridine derivatives satisfy condition 2a that the melting point $T_m$(1 atm) of the solvent at 1 atmosphere be less than 20° C. For the case in which the polycarbonate is MAKROLON 2608 whose glass transition temperature $T_g$ is approximately 145° C., all of the pyridine derivations in Table 1 likewise meet condition 2c that the boiling point $T_b$ (0.001 atm) of the polycarbonate solvent at 0.001 atmosphere be no more than ($T_g$+15° C.). Furthermore, it appears that all of these pyridine derivatives satisfy condition 2g that the acid dissociation constant of the protonated form of the polycarbonate solvent in aqueous solution be greater than $10^{-8}$ at 20° C. and 1 atmosphere.

The polycarbonate solvent may alternatively or additionally be formed with pyrrole or/and one or more ring-substituted pyrrole derivatives (hereafter, for simplicity, generally referred to in the singular as a ring-substituted pyrrole derivative). When the solvent utilizes pyrrole or/and a ring-substituted pyrrole derivative, the solvent likewise meets all the polycarbonate solvent criteria given above. Either pyrrole or the ring-substituted pyrrole derivative may be the primary constituent of the solvent when both constituents are present in the solvent and any other polycarbonate-dissolving constituent candidate is present at a lower mass fraction.

Both pyrrole and the ring-substituted pyrrole derivative can be chemically represented as:

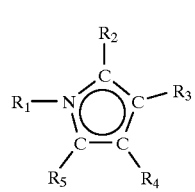

(11)

where N represents a nitrogen atom, and each of $R_1$, $R_2$, $R_3$, $R_4$ and $R_5$ represents a monovalent substituent bonded covalently to the ring. Each of $R_1$ to $R_5$ is typically a hydrogen atom, a deuterium atom, a monovalent hydrocarbon group, a monovalent substituted hydrocarbon group, an acetyl group, a carboxaldehyde group, a halogen atom, or a monovalent pseudo-halogen substituent. For the hydrocarbon group or the substituted hydrocarbon group, the number of carbon atoms for each of $R_1$ through $R_5$ normally ranges from one to four.

Formula 11 yields pyrrole when each of $R_1$ through $R_5$ is hydrogen or deuterium. The empirical formula for pyrrole is $C_4H_5N$ in the fully hydrogen-substituted molecule. A ring-substituted pyrrole derivative is produced when at least one of $R_1$ through $R_5$ is a substituent other than hydrogen or deuterium, preferably one from the above list.

Several types of ring-substituted pyrrole derivatives are of special interest for use as the polycarbonate solvent. One type is the case in which $R_1$ is an alkyl group, preferably having from one to four carbon atoms. The remainder of $R_2$ through $R_5$ may consist of any of the monovalent covalent substituents given above, including hydrogen and deuterium.

For example, one ring-substituted pyrrole derivative having $R_1$ as an alkyl group is 1-methylpyrrole (or N-methylpyrrole) for which the alkyl group is a methyl group (one carbon atom). The empirical formula for 1-methylpyrrole is $C_5H_7N$ in the fully hydrogen-substituted molecule. 1-methylpyrrole has a melting point $T_m(1 \text{ atm})$ of approximately $-57°$ C. at 1 atmosphere and a boiling point $T_b(1 \text{ atm})$ of approximately $113°$ C. at 1 atmosphere. Consequently, conditions 2a and 2b are met with 1-methylpyrrole.

The boiling point of a liquid decreases with decreasing pressure. Since the boiling point $T_b(1 \text{ atm})$ of 1-methylpyrrole at 1 atmosphere is approximately $113°$ C. and is therefore less than $(T_g+15°$ C.) for MAKROLON 2608 polycarbonate whose glass transition $T_g$ is approximately $145°$ C., 1-methylpyrrole necessarily satisfies condition 2c when the polycarbonate is MAKROLON 2608. 1-methylpyrrole, a much weaker base than pyridine, satisfies solvent condition 2g and the polycarbonate solubility requirements given above.

A second type of pyrrole derivative of special interest consists of those derivatives in which two adjacent substituent positions are taken up by a fused ring, i.e., a ring substituent which shares an edge with the pyrrole ring. A benz-fused example of this type of pyrrole derivative is given below:

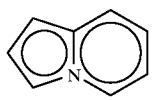

(12)

Substituents suitable for each ring carbon outside the fused edge in a fused-ring substituent derivative of pyrrole are the same as those described above for the fused-ring substituent derivatives of pyridine. Consequently, the substituent ring in a fused-ring substituent derivative of pyrrole may itself be substituted. The remainder of the substituent positions may be taken up by one or more of the substituent groups listed above for $R_1$ through $R_5$ in formula 11. Examples of appropriate benz-fused derivatives of special interest are the substituted indoles, formula 12.

When at least one of $R_1$ through $R_5$ in formula 11 is a halogen atom, the halogen can be fluorine, chlorine, bromine or iodine, with fluorine or chlorine being preferred substituents. In the case of pseudo-halogen substituents, the substituent is typically a nitrile group.

Aside from 1-methylpyrrole, other pyrrole derivatives of specific interest for use as the polycarbonate solvent in the liquid chemical formulation of the invention include the liquids given in the following table:

TABLE 2

| Chemical Name | Empirical Formula | $T_b(1 \text{ atm})$ (° C.) |
|---|---|---|
| 2-methylpyrrole | $C_5H_7N$ | 147 |
| 3-methylpyrrole | $C_5H_7N$ | 142 |
| 1-ethylpyrrole | $C_6H_9N$ | 129 |
| 2-ethylpyrrole | $C_6H_9N$ | 163 |
| 2,4-dimethylpyrrole | $C_6H_9N$ | 171 |
| 2,5-dimethylpyrrole | $C_6H_9N$ | 170 |
| 1-tert-butylpyrrole | $C_6H_{13}N$ | 153 |
| 2-isopropylpyrrole | $C_7H_{11}N$ | 171 |
| 1-propylpyrrole | $C_7H_{11}N$ | 145 |
| 1-butylpyrrole | $C_8H_{13}N$ | 170 |
| 2,3-dimethyl-4-ethylpyrrole | $C_8H_{13}N$ | 198 |
| 2,4-dimethyl-3-ethylpyrrole | $C_8H_{13}N$ | 197 |
| 3-ethyl-2,4,5-trimethylpyrrole | $C_9H_{15}N$ | 213 |
| 1-phenylpyrrole | $C_{10}H_9N$ | 234 |
| 1-benzylpyrrole | $C_{11}H_{11}N$ | 247 |
| 1-acetylpyrrole | $C_6H_7NO$ | 181 |
| 2-acetylpyrrole | $C_6H_7NO$ | 220 |

Besides satisfying condition 2b that the boiling point of the polycarbonate solvent at 1 atmosphere be at least $80°$ C. as indicated by the boiling point data given in Table 2, all of the foregoing pyrrole derivatives satisfy condition 2a that the melting point $T_m(1 \text{ atm})$ of the solvent at 1 atmosphere be less than $20°$ C. For MAKROLON 2608 polycarbonate with glass transition temperature $T_g$ of approximately $145°$ C., all of the pyrrole derivatives in Table 2 meet condition 2c that the boiling point $T_b$ (0.001 atm) of the polycarbonate solvent at 0.001 atmosphere be no greater than $(T_g+15°$ C.). All of these pyrrole derivatives also appear to satisfy condition 2g that the protonated form of the polycarbonate have an acid dissociation constant greater than $10^{-8}$ at $20°$ C. and 1 atmosphere.

The polycarbonate solvent may alternatively or additionally be formed with pyrrolidine or/and one or more pyrrolidine derivatives (hereafter, for simplicity, generally referred to in the singular as a pyrrolidine derivative). When the solvent utilizes pyrrolidine or/and a pyrrolidine derivative, the solvent likewise meets all the polycarbonate solvent criteria given above.

Pyrrolidine and pyrrolidine derivatives can be chemically represented in general as:

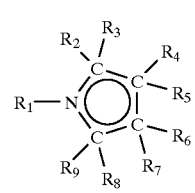

(13)

where N represents a nitrogen atom, and $R_1$ through $R_9$ represent covalently bonded substituents, with the maximum possible number of substituents being depicted in formula 13. In the parent compound pyrrolidine (probably of limited use here because of its excessive Bronsted basicity), $R_1$ through $R_9$ are hydrogen or deuterium atoms.

Substituents for $R_1$ through $R_9$ in formula 13 are typically chosen from hydrogen atoms, deuterium atoms, oxygen atoms, monovalent or bivalent hydrocarbon groups, monovalent or bivalent substituted hydrocarbon groups, acetyl groups, carboxaldehyde groups, halogen atoms, or monovalent pseudo-halogen substituents. For each hydrocarbon group or substituted hydrocarbon group, the number of carbon atoms for each of $R_1$ through $R_9$ normally ranges from one to four. Pyrrolidine derivatives which include one endocyclic double bond between ring atoms are also of interest.

Several pyrrolidine derivatives are of special interest for use as the polycarbonate solvent. For example, pyrrolidine derivatives of particular interest include those in which the ring nitrogen participates in, or is conjugated with, a multiple covalent bond, either endocyclicly or exocyclicly. Pyrrolidine derivatives having a covalent substituent ($R_1$) other than hydrogen or deuterium at the nitrogen position are also of particular interest. In pyrrolidine derivatives having a covalent substituent other than hydrogen or deuterium at the nitrogen position, the nitrogen atom may also be conjugated with a multiple covalent bond. All of these situations lead to a significant decrease in the basicity of the solvent compared to the parent compound, pyrrolidine.

Examples of such pyrrolidine derivatives having a double covalent bond are shown below:

(14)

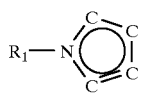

(15)

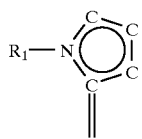

(16)

Aside from the limitations imposed by the double bond, substituents for $R_2$ through $R_9$ in formulas 14 through 16 can be chosen from any of those described above in connection with formula 13. Formula 14 illustrates the case in which the ring nitrogen participates in a double covalent bond. Formulas 15 and 16 illustrate the situations in which the ring nitrogen is conjugated respectively with an endocyclic double covalent bond and an exocyclic double covalent bond. For cases in which $R_1$ is not hydrogen or deuterium, formulas 15 and 16 constitute pyrrolidine derivatives in which a covalent substituent other than hydrogen or deuterium is at the nitrogen position.

For example, one pyrrolidine derivative chemically arranged according to formula 16 is 1-methylpyrrolidinone (or 1-methylpyrrolidone or N-methylpyrrolidone from which comes the common name NMP) whose empirical formula is $C_5H_9NO$. 1-methylpyrrolidinone has a methyl substituent ($R_1$) on the ring nitrogen, and one of the carbon atoms in the alpha position relative to the nitrogen atom is bonded to an oxygen atom via a conjugated exocyclic double bond as shown below:

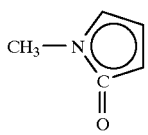

(17)

1-methylpyrrolidinone has a melting point $T_m(1\ atm)$ of approximately $-24°$ C. at 1 atmosphere and a boiling point $T_b(1\ atm)$ of approximately $202°$ C. at 1 atmosphere. Conditions 2a and 2b are therefore satisfied with 1-methylpyrrolidinone. The boiling point of 1-methylpyrrolidinone at 0.018 atmosphere is approximately $84°$ C. Since boiling point decreases with decreasing pressure, the boiling point $T_b(0.001\ atm)$ of 1-methylpyrrolidinone at 0.001 atmosphere is less than $84°$ C. For dissolving a polycarbonate such as MAKROLON 2608 whose glass transition $T_g$ temperature is approximately $145°$ C., 1-methylpyrrolidinone satisfies condition 2c above that the boiling point $T_b(0.001\ atm)$ of the polycarbonate solvent at 0.001 atmosphere be no more than $(T_g+15°\ C.)$. 1-methylpyrrolidinone is a much weaker base than pyridine and satisfies the polycarbonate solubility requirements given above.

When at least one covalent substituent in formula 13 is a halogen atom, the halogen can be fluorine, chlorine, bromine or iodine, with fluorine or chlorine being preferred substituents. In the case of pseudo-halogen substituents, the substituent is typically a nitrile group.

Aside from 1-methylpyrrolidinone, other pyrrolidine derivatives of specific interest for use as the polycarbonate in the present liquid chemical formulation include the liquids given in the following table:

TABLE 3

| Chemical Name | Empirical Formula | $T_b(1\ atm)$ (° C.) |
|---|---|---|
| 2-pyrrolidinone | $C_4H_7NO$ | 128 |
| 1-ethyl-2-pyrrolidinone (or N-ethylpyrrolidone) | $C_6H_{11}NO$ | 97 |
| 1-cyclohexylpyrrolidinone (or N-cyclohexylpyrrolidone) | $C_{10}H_{17}NO$ | 153 |

In addition to satisfying condition 2b that the boiling point of the polycarbonate solvent at 1 atmosphere be at least $80°$ C. as indicated by the boiling point data given in Table 3, all of the foregoing pyrrolidine derivatives satisfy condition 2a that the melting point $T_m(1\ atm)$ of the solvent at 1 atmosphere be less than $20°$ C. For MAKROLON 2608 polycarbonate with an approximate $145°$ C. $T_g$, all of the pyrrolidine derivatives in Table 3 meet condition 20 that the boiling point $T_b$ (0.001 atm) of the polycarbonate solvent at 0.001 atmosphere be no greater than $(T_g+15°\ C.)$. It also appears that all of these pyrrolidine derivatives satisfy condition 2g that the protonated form of the polycarbonate have an acid dissociation constant greater than $10^{-8}$ at $20°$ C. and 1 atmosphere.

The polycarbonate solvent may alternatively or additionally be formed with either or both of chlorobenzene and cyclohexanone. The respective empirical formulas for these two liquids are $C_6H_5Cl$ and $C_6H_{10}O$. Chlorobenzene and cyclohexanone can be chemically represented respectively as:

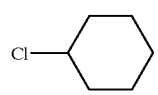

(18)

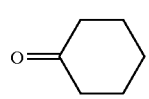

(19)

where the intersection of two or more lines again represents a carbon atom.

When the solvent utilizes chlorobenzene or cyclohexanone, the solvent meets all of the polycarbonate solvent criteria given above. Either of these liquids may be the primary constituent of the solvent when the other liquid is present in the solvent and any other polycarbonate-dissolving constituent candidate is present at a lower mass fraction.

Chlorobenzene, a monohalogenated benzene ring, is a weak (or soft) base. Chlorobenzene is largely insoluble in water. Nonetheless, the protonated form of chlorobenzene appears to have an acid dissociation constant greater than $10^{-8}$ in aqueous solution at 20° C. Accordingly, chlorobenzene satisfies condition 2g that the acid dissociation constant of the protonated form of the polycarbonate solvent in aqueous solution be greater than $10^{-8}$ at 20° C.

The 1-atmosphere melting point $T_m$(1 atm) of chlorobenzene is approximately −46° C. Chlorobenzene therefore meets condition 2a that the 1-atmosphere melting point $T_m$(1 atm) of the polycarbonate solvent be less than 20° C. The 1-atmosphere boiling point $T_b$(1 atm) of chlorobenzene is approximately 132° C. Consequently, chlorobenzene meets condition 2b that the 1-atmosphere boiling point $T_b$(1 atm) of the solvent be no more than 80° C. Chlorobenzene's boiling point at 0.013 atmosphere is approximately 22° C. Condition 2c specifies that the 0.001-atmosphere boiling point $T_b$(0.001 atm) of the solvent be no more than ($T_g$+15° C.). Since boiling point decreases with decreasing pressure, chlorobenzene meets condition 2c for polycarbonates such as MAKROLON 2608 whose glass transition temperature $T_g$ is approximately 145° C.

Cyclohexanone is also a weak base. The acid dissociation constant of the protonated form of cyclohexanone in aqueous solution appears to be greater than 108 at 20° C. Hence, cyclohexanone appears to satisfy condition 2g.

The 1-atmosphere melting point $T_m$(1 atm) of cyclohexanone is approximately −16° C., enabling cyclohexanone to meet condition 2a. The 1-atmosphere boiling point $T_b$(1 atm) of cyclohexanone is approximately 156° C. so that cyclohexanone satisfies condition 2b. With a boiling point of 47° C. at 0.020 atmosphere, cyclohexanone also meets condition 2c for polycarbonates such as MAKROLON 2608.

Polycarbonate Film Preparation

Figure 3:
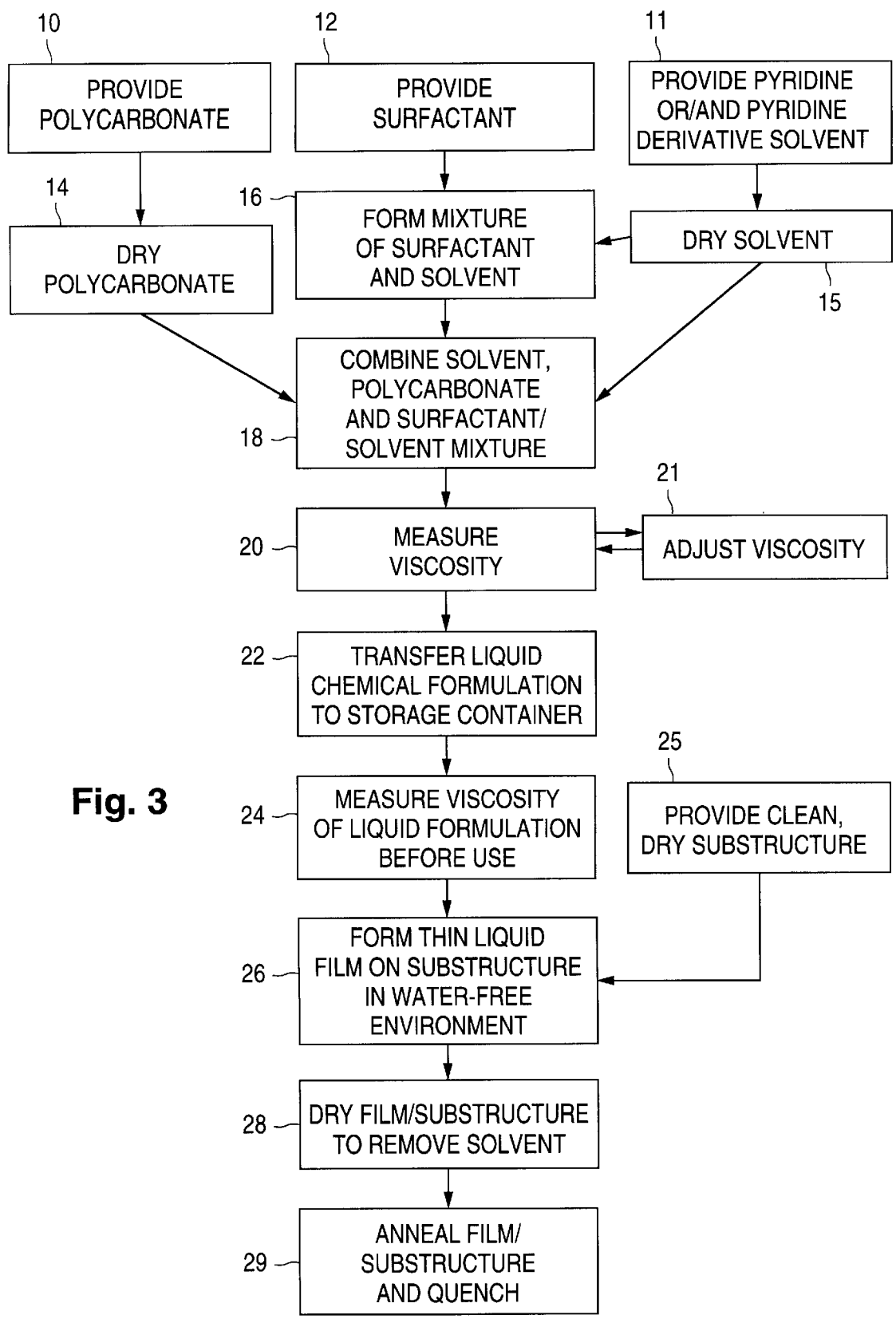
FIG. 3 is a flow chart of a process for producing a polycarbonate-containing liquid chemical formulation for use in accordance with the invention and then utilizing the liquid formulation so produced to make a solid polycarbonate film according to the invention's teachings.

FIG. 3 presents a flowchart of the primary steps involved in producing a polycarbonate-containing liquid chemical formulation in accordance with the invention and then using the liquid formulation to make a thin, solid polycarbonate film according to the invention's teachings. FIG. 3 illustrates the preferred case in which the polycarbonate solvent consists substantially of pyridine or/and a ring-substituted pyridine derivative.

The first steps in making the polycarbonate film are, as shown in blocks 10, 11 and 12 of FIG. 3, to provide: (a) polycarbonate material, (b) a polycarbonate solvent formed with pyridine or/and a ring-substituted pyridine derivative and (c) a surfactant. The solvent preferably consists of essentially 100% pyridine and is substantially water-free. The polycarbonate material normally consists of granulated MAKROLON polycarbonate, preferably MAKROLON 2608. The surfactant preferably is Fluorad FC-430 polymeric ester mixture.

If the polycarbonate material is not water-free, it is dried in a water-free environment, typically overnight in flowing dry nitrogen between 120° C. and 125° C., as indicated in block 14. The water content of the polycarbonate is thereby reduced to a value typically less than 0.01% by mass. If other solid materials are to be present in the liquid chemical formulation, they are dried similarly. Suitable methods for drying and handling water-sensitive and air-sensitive materials are described in Shriver et al., *The Manipulation of Air-Sensitive Compounds* (John Wiley & Sons), 1986. Also see "Handling air-sensitive reagents," *Tech. Bull. AL*-134, Aldrich Chemical Co., December 1994, 8 pp.

If the water content of the polycarbonate solvent is too great, the solvent is normally dried, block 15. Standard methods may be used. For example, the solvent may be treated with vacuum-dried molecular sieves followed by distillation under an inert, dry atmosphere.

A stock liquid mixture (substantially a solution) of the surfactant and the dried polycarbonate-solvent is prepared by combining a weighed portion of the surfactant with an aliquot of the dry solvent under an inert atmosphere, block 16.

The liquid chemical formulation is now formed by combining the substantially dry polycarbonate material, possibly one or more other dry solid materials, an aliquot of the stock surfactant/solvent mixture and the substantially dry polycarbonate solvent, all in a water-free environment, typically dry nitrogen. The mass percentage of polycarbonate is chosen to yield a solid polycarbonate film thickness in the range 0.1 to 2 µm and with thickness uniformity described previously. Block 18 in FIG. 3 illustrates this step, described further below.

In preparing the liquid chemical formulation, the dry polycarbonate solvent is transferred to a clean, dry, weighed container using Schlenck transfer methods, typically under dry nitrogen. The container is weighed to determine the mass of solvent. The aliquot of surfactant/solvent mixture is also transferred using Schlenck methods, and its mass is determined by a difference technique. Finally, the dry polycarbonate material is loaded into the container, again using Schlenck transfer techniques, and the mass of the polycarbonate is determined by a difference technique. Any other solids are added, and their masses are determined in a similar manner.

If magnetic stirring is to be used to mix the liquid formulation, an appropriate magnetic stirring bar is added at this time. Finally, the container is sealed under a slight positive pressure of inert dry gas, typically dry nitrogen. The constituents of the liquid formulation are mixed for a sufficient time to form a homogeneous liquid. Up to 3 days may be needed to dissolve all the dissolvable solid material at an ambient temperature $T_{amb}$ of 20° C. using slow magnetic stirring.

After all the polycarbonate and other dissolvable solid materials have been dissolved, the kinematic viscosity of the liquid chemical formulation is determined, as indicated in block 20. The kinematic viscosity of the solution may be adjusted, block 21, by adding more of the dry polycarbonate solvent to decrease viscosity, or by adding more dry polycarbonate to increase viscosity, or by changing the temperature of the liquid formulation, or by mixing two or more liquid chemical formulations of different kinematic viscosities made from the same polycarbonate material. All such operations are performed under inert-atmosphere conditions and are followed by thorough mixing of the resulting polycarbonate-containing liquid formulation.

After any necessary changes have been made to the kinematic viscosity of the liquid chemical formulation, the formulation is transferred to a dry container, typically under a slight positive pressure of dry, inert gas, typically dry nitrogen. Block 22 indicates this step. The container is sealed gas-tight and the formulation is stored, preferably at or below normal room temperature to minimize chemical degradation of the polycarbonate through hydrolysis or other reactions.

The fabrication of the polycarbonate film begins with the determination of the kinematic viscosity of the polycarbonate-containing liquid chemical formulation immediately prior to use, block 24. Significant changes in the kinematic viscosity of the liquid formulation during storage are indicative of chemical or physical degradation. Degradation of the formulation may affect the quality of polycarbonate films made with the formulation.

Measurements of kinematic viscosity can be performed in a number of ways. For example, a sample of the liquid chemical formulation may be removed and tested, a viscosity measurement device may be incorporated into the liquid formulation dispensing equipment, or viscosity may be measured indirectly by the preparation of witness samples of polycarbonate films whose thicknesses are compared to a calibration curve.

The polycarbonate film is formed on a clean, dry substructure. In the preferred method, block 25, the substructure is cleaned of surface dirt and particles, degreased by washing in appropriate non-aqueous organic solvents and dried at temperature greater than 100° C. in a flow of inert gas. If necessary, the surface can be oxidized, once cleaned, to improve wetting by the polar liquid chemical formulation of the invention. It is important that the liquid formulation wet the surface of the substructure at a contact angle significantly less than 90°, preferably approaching 0°.

Assuming that the kinematic viscosity of the liquid chemical formulation is acceptable, a portion of the liquid formulation is delivered to the surface of the substructure in a substantially water-free environment, typically dry nitrogen. The volume of formulation so delivered should be in excess of the volume of uniform liquid film prepared in the next step. The formulation should be delivered in a slow stream at the center of rotation of the substructure in such a way that gas bubbles are not formed or entrained in the delivered liquid formulation. Gas bubbles adhering to the surface of the substructure or floating on the surface of the delivered formulation lead to inhomogeneities in the thickness of the liquid film produced in the next step and thus are undesirable. The substructure may be stationary or slowly-rotating during the dispensing of the formulation.

Figure 4:
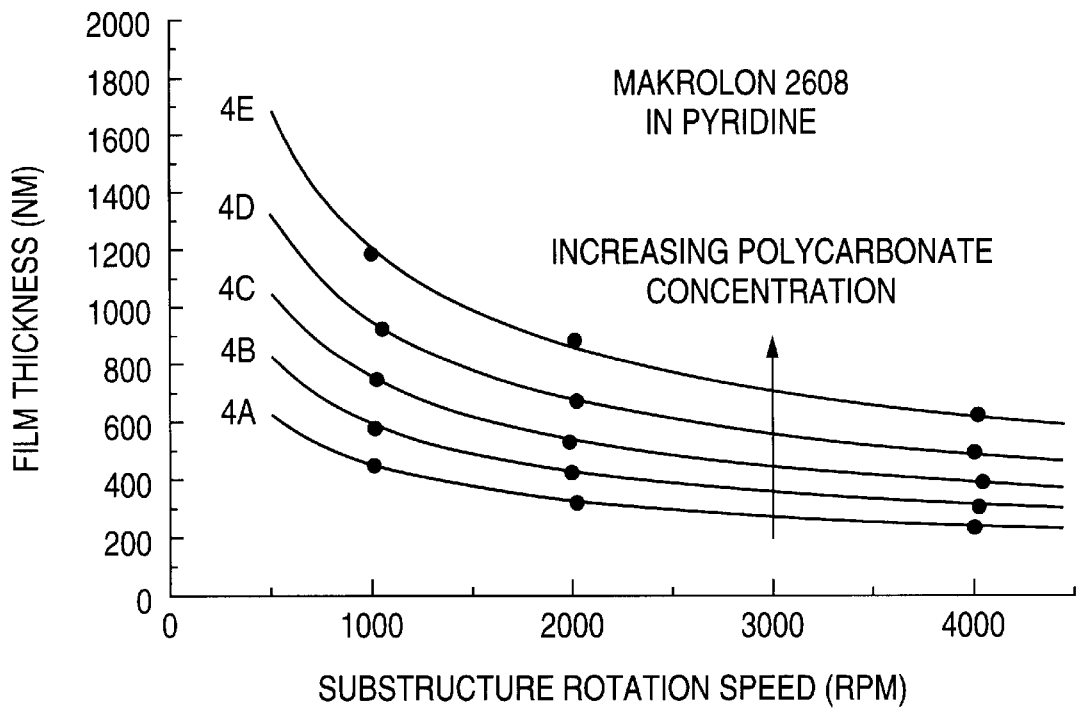
FIG. 4 is a graph which illustrates the dependence of solid polycarbonate film thickness on the rotational speed of the substructure for polycarbonate films formed by spin coating polycarbonate-containing liquid chemical formulations onto a planar substructure. Curves are shown for five solutions of different polycarbonate concentration but made from the same molecular weight polymer, and using the same polycarbonate-containing solvent.

While keeping the resulting structure in a substantially water-free environment, the substructure is spun on an axis normal to its surface to convert the portion of liquid chemical formulation on the substructure into a thin polycarbonate-containing liquid film. FIG. 4 illustrates the dependence of solid polycarbonate film thickness on the rotation speed of the substructure, for polycarbonate films formed by spin coating polycarbonate/pyridine solutions. Curves are shown for five polycarbonate solutions made from the same molecular weight polymer, MAKROLON 2608 polycarbonate, present at different concentrations in the same solvent, pyridine: (4A) 55 g polycarbonate/kg pyridine, (4B) 65 g/kg pyridine, (4C) 76 g/kg pyridine, (4D) 87 g/kg pyridine, and (4E) 100 g/kg pyridine.

The points in FIG. 4 are measured values and the curves are model curves fitted to the data points by least-squares regression. The model is an extended Prandtl Layer hydrodynamic model defined by the equation:

$$d=(mc+b)c(v/\omega)^{1/2} \qquad (20)$$

where d is the thickness of the solid polycarbonate film, c again is the concentration of polycarbonate, m and b are empirical constants dependent upon the type of polycarbonate, its molecular weight and the identity of the polycarbonate solvent, $v$ again is the kinematic viscosity of the liquid chemical formulation, and $\omega$ is the rotation speed of the substructure. All the curves in FIG. 4 were generated from the same best-fit values of m and b. Equation 1 may be used to estimate the kinematic viscosity of the solution from the concentration of the polycarbonate, provided the empirical constant a is known.

The preferred rotation speed $\omega$ of the substructure is 1000 to 3000 rpm, typically 1100 to 1200 rpm, when the polycarbonate is MAKROLON 2608 at a concentration of approximately 75 g/kg polycarbonate solvent, and the polycarbonate solvent is pyridine. The angular acceleration rate d$\omega$/dt is preferably high enough to prevent uneven spreading of the polycarbonate-containing liquid chemical formulation over the substructure due to "viscous fingering" of the liquid formulation, yet low enough to permit adequate wetting of the substructure as the perimeter of the dispensed formulation spreads over the surface of the substructure. The preferred value of angular acceleration d$\omega$/dt is 10 rpm/s when the polycarbonate is MAKROLON 2608, the polycarbonate solvent is pyridine, and the polycarbonate concentration is approximately 75 g polycarbonate/kg pyridine. The delivery of liquid formulation and the spin coating operations are preferably done in a continuous sequence. Block 26 in FIG. 3 summarizes the operations by which spin coating is used to form the polycarbonate-containing liquid film.

The liquid film and the underlying substructure are dried to remove the polycarbonate solvent and any other volatile components of the film as indicated in block 28 of FIG. 3. The drying operation can be performed at room temperature or at an elevated temperature and/or reduced pressure, typically as low as 0.001 atmosphere, to reduce the drying time. Typically, the structure is placed on a dry-air-vented hotplate at 125° C. for 30 s after MAKROLON 2608 has been spin-coated from the pyridine-based liquid formulation onto a substructure. Since the glass transition temperature $T_g$ of MAKROLON 2608 is approximately 145° C., the drying temperature is below the glass transition point for MAKROLON 2608. Accordingly, the polycarbonate film is produced as a microcrystalline solid, i.e., in a glassy state.

For elevated-temperature film drying, the drying temperature is controlled so as to avoid exceeding the glass transition temperature $T_g$ of the polycarbonate by more than approximately 15° C. This prevents the resultant polycarbonate film (a) from being produced in an undesirable rubbery state, a condition that would arise if the drying temperature at the end of the drying operation were to reach a value slightly more than approximately 15° C. above the polycarbonate $T_g$ or (b) from being produced in an undesirable molten state, a condition that would occur if the drying temperature to the end of the drying operation were to reach a value considerably greater than 15° C. above the polycarbonate $T_g$.

The rate at which the volatile components evaporate from the polycarbonate-containing liquid film increases as the drying pressure decreases. If reduced pressure is employed during the drying procedure to reduce the drying time, the polycarbonate-containing liquid film is placed in a vacuum chamber attached to a suitable vacuum pumping system. The lowest chamber pressure to which the liquid film is subjected by the vacuum system during the drying operation is, as indicated above, typically in the vicinity of 0.001 atmosphere.

For drying at 0.001 atmosphere, it is necessary to satisfy the condition that the vapor pressure of the polycarbonate solvent be at least equal to, normally greater than, 0.001 atmosphere at the drying temperature to ensure that substantially all of the solvent is removed from the liquid film.

To avoid producing the polycarbonate film in a rubbery or molten state, the drying temperature at the end of the drying operation must not be greater than approximately 15° C. above the glass transition temperature $T_g$ of the polycarbonate material. The result of these two conditions is that the boiling point $T_b(0.001$ atm) of the polycarbonate solvent at 0.001 atmosphere should be no more than approximately 15° C. above the polycarbonate glass transition temperature $T_g$.

The polycarbonate material remaining after the drying step is in the form of a uniform, thin, normally microcrystalline solid film. The solid film may also contain other non-volatile solid materials or reaction products as minor components, as described previously. Except when the present liquid chemical formulation has been provided with an additive (e.g., a black dye) to make the solid film opaque, the solid film is normally transparent. Typically, the thickness and thickness uniformity of the solid polycarbonate film are now tested to determine whether those parameters fall within the desired range of values. In some applications, the drying and testing operations complete the polycarbonate film manufacturing process. If a high degree of uniformity is needed in polycarbonate density, further processing of the film is performed as described below.

In other applications, the polycarbonate film is annealed at a temperature $T_{ann}$ sufficiently high to transform the polycarbonate from a glass-like solid having some short-range molecular ordering into a viscous, amorphous, leathery or retarded-elastic (here referred to collectively as "leathery") state, block 29. When the polycarbonate film is transformed to the leathery state, the film has largely no short-range or long-range molecular ordering.

To make the glassy-state-to-leathery-state transformation in the polycarbonate structure, the annealing temperature $T_{ann}$ normally must equal or exceed the glass transition temperature $T_g$ of the polycarbonate. However, the annealing temperature $T_{ann}$ should not be high enough to form a rubbery solid or a viscous melt, conditions which could cause significant flow of the polycarbonate. Since these undesirable conditions occur when the polycarbonate is raised to significantly greater than 15° C. above the polycarbonate $T_g$, the annealing temperature $T_{ann}$ lies in a range extending approximately from the polycarbonate $T_g$ to approximately 15° C. above the polycarbonate $T_g$. Typically, the annealing temperature $T_{ann}$ is chosen to be close to 15° C. above the glass transition temperature $T_g$ of the polycarbonate in order to maximize the rate at which the polycarbonate film is transformed to the leathery state without entering the undesirable rubbery state.

After completing the annealing step, the leathery polycarbonate film is quenched (rapidly cooled) so as to make the film hard again while retaining the largely non-ordered molecular microstructure of the leathery state. The annealing and quenching of the solid polycarbonate film can encompass the drying operation, or can be performed as a separate annealing/quenching operation after the film is dried.

The physical microstructure of the polycarbonate changes during the annealing/quenching operation. However, the chemical make-up of the polycarbonate remains substantially the same. If the film was transparent at the end of the drying operation, the film normally remains transparent through the annealing/quenching steps. The annealing/quenching operation typically improves the adhesion of the polycarbonate film to the substructure as well as improving the optical uniformity of the film while decreasing birefringence. If the substructure is not perfectly planar, the annealing/quenching operation also improves the degree of planarization of the surface of the polycarbonate film, although at the expense of film thickness uniformity.

It is preferable to anneal the film in a suitable oven, although a hot plate or other method of heating in a controlled environment may be used. When the polycarbonate is MAKROLON 2608, the annealing is typically done at 160° C. This is approximately 15° C. above the glass transition temperature of MAKROLON 2608. Typically, the structure is annealed for 15 minutes under flowing dry nitrogen at 160° C., and then for 45 minutes under dynamic vacuum at the same temperature.

The polycarbonate film is then cooled rapidly down to room temperature. That is, the polycarbonate film is quenched, again block 29. The cooling rate is typically greater than 0.1° C./s. With the structure removed from the annealing oven, cooling is typically performed under natural convection by placing the structure in dry nitrogen or clean dry air with a relative humidity less than 45%. By cooling the polycarbonate film rapidly through its glass transition temperature $T_g$, the polycarbonate material returns to a hard solid condition while retaining the microstructure of a substantially leathery state. Crystallinity (i.e., short-range and long-range molecular ordering) of the final film is kept to a minimum. The annealing and quenching of the polycarbonate produces an isotropic glass with highly uniform density and near-minimum birefringence.

Figure 5:
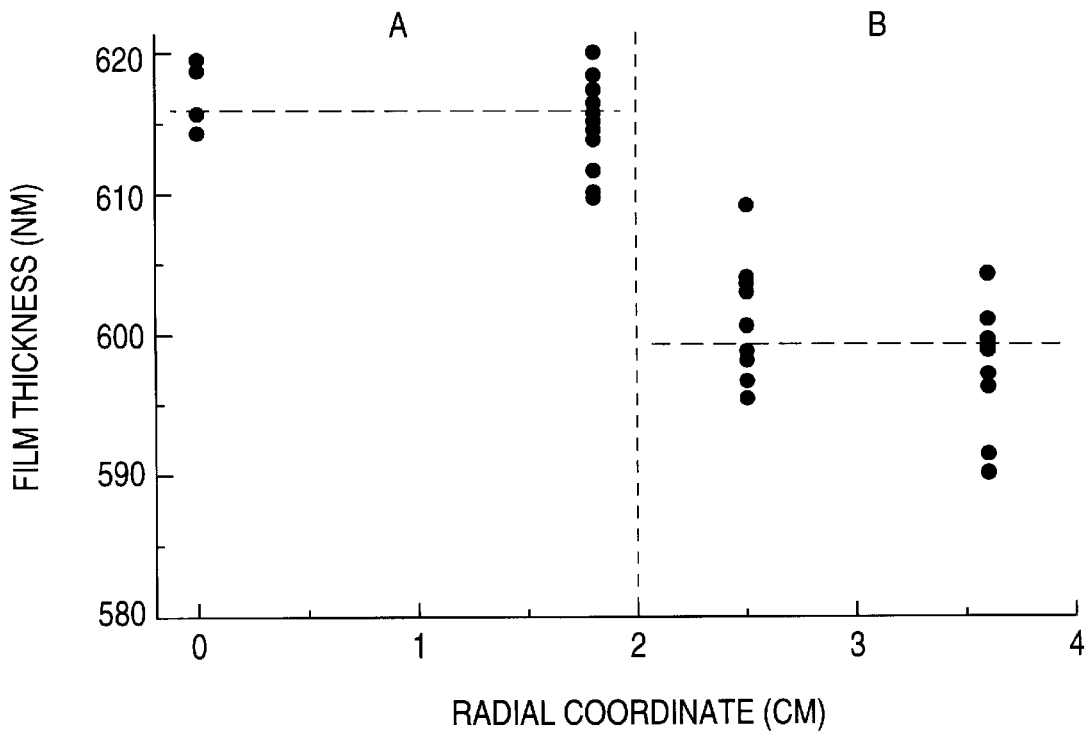
FIG. 5 is a graph which shows the dependence of solid polycarbonate film thickness on the radial coordinate of sampled points for polycarbonate films made by spin coating a polycarbonate-containing solution onto a planar, generally circular substructure according to the invention's teachings.

FIG. 5 shows the dependence of dry film thickness on the radial coordinate of the sampled point for a solid polycarbonate film made by spin coating on a planar substructure as described above. The substructure was secured to the spinning chuck by applying vacuum to the rear surface of the substructure through a channel at the center of rotation, i.e., at a radial coordinate of 0. A compliant O-ring made a seal between the vacuum chuck and the substructure at a radial coordinate of 2 cm. Hence, film thickness data measured in region 5A were for the part of the substructure in hard mechanical contact with the spinning chuck, and data measured in region 5B were for the part of the substructure in soft mechanical contact with the spinning chuck.

The film thickness data in region 5A have a 95% confidence interval of 615±6 nm, i.e., this part of the substructure has a film thickness uniformity of ±0.9%. The film thickness data in region 5B have a 95% confidence interval of 599±9 nm, i.e., this part of the substructure has a film thickness uniformity of ±1.5%. The mean values of film thickness in the two regions differ by 2.7%. Considering both regions together gives a 95% confidence interval for the film thickness of 608±20 nm, i.e., the substructure as a whole has a film thickness uniformity of ±3.2%.

The data of FIG. 5 are typical for solid polycarbonate films formed by spin coating. Reproducibility from film to film is a function of the reproducibility of the coating method, but mean film thicknesses typically exhibit variations of no more than ±2% when spin coating is used to prepare the films, and rotation speeds are maintained constant to a precision better than ±1%.

FIGS. 6a–6d (collectively "FIG. 6") pictorially illustrate how the present polycarbonate-containing liquid chemical formulation is applied to the substructure and then processed to make the polycarbonate film. In particular, the processing steps of blocks 26 and 28 of FIG. 3 are largely shown in FIG. 6.

Figure 6A:
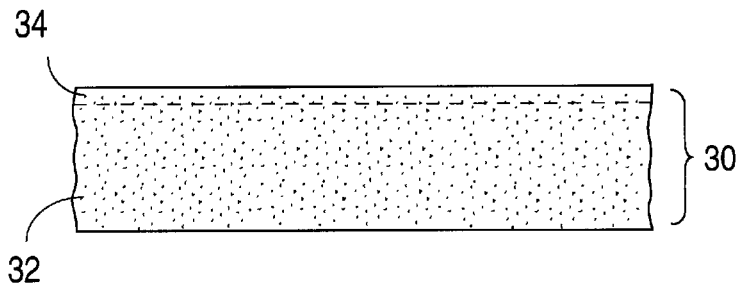
FIGS. 6a, 6b, 6c and 6d are cross-sectional views illustrating operations performed on a substructure to create a polycarbonate film according to the process of FIG. 3.

The starting point in FIG. 6a is a substructure 30 whose primary constituent is typically a body 32 of electrically non-insulating material, i.e., body 32 and substructure 30 typically consist of electrically conductive and/or semiconductive material. Alternatively, body 30 may partially or wholly consist of electrically insulating material which may be coated with non-insulating material, or body 30 may be entirely composed of insulating material. An adhesion-promoting or wetting layer 34 is optionally situated along the upper surface of body 32. In any case, substructure 30 is usually in the shape of a plate having a substantially flat upper surface.

Figure 6B:
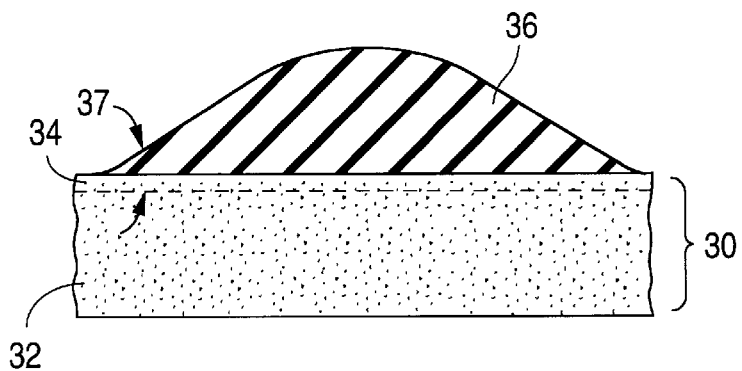

A portion 36 of the polycarbonate-containing liquid chemical formulation is deposited on top of substructure 30 as indicated schematically in FIG. 6b. The wetting of polycarbonate-containing liquid portion 36 on substructure surface 32 should be such that the contact angle 37 of portion 36 is substantially less than 90°, as shown.

Figure 6C:
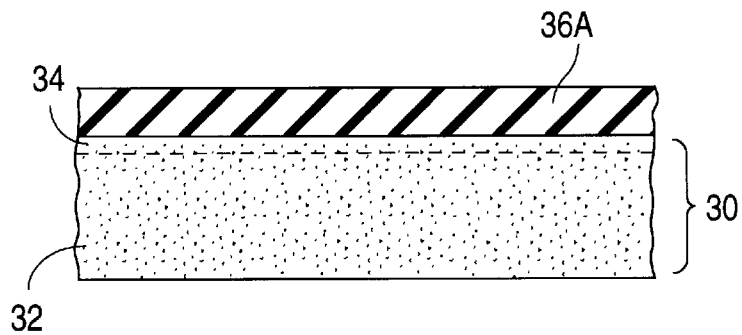

Either during or subsequent to the delivery of portion 36 of the liquid chemical formulation, the structure formed by substructure 30 and liquid portion 36 is spun using a suitable apparatus to convert portion 36 into a polycarbonate-containing liquid film 36A of the liquid formulation. See FIG. 6c. By appropriately controlling the speed, acceleration and duration of rotation, the kinematic viscosity of the formulation, and the concentration of the polycarbonate and other solid material such as surfactant, liquid film 36A achieves a highly uniform thickness across the substructure. In the structure of FIG. 6c, liquid film 36A has substantially all of the characteristics of the liquid chemical formulation of the invention.

Figure 6D:
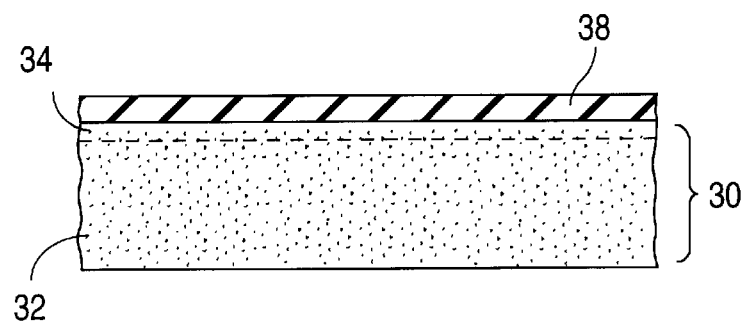

The liquid chemical formulation is then processed to remove the polycarbonate solvent and any other volatile constituents. Liquid film 36A is thus converted into a solid polycarbonate film 38 as shown in FIG. 6d. This transformation is accomplished during the drying and/or annealing operations described above. Polycarbonate film 38 is now ready for use in a desired application.

Aperture Formation

Figure 7:
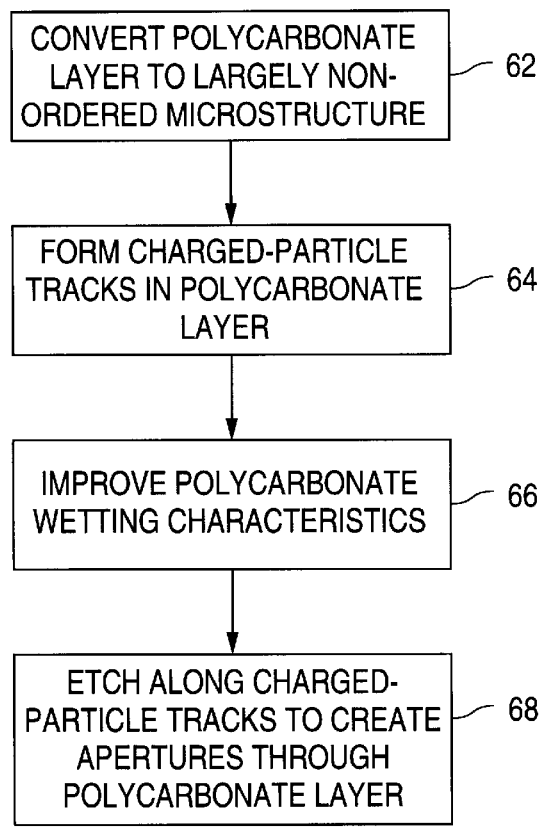
FIG. 7 is a flow chart of a set of processing steps performable on the polycarbonate film of FIG. 3 for providing the film with apertures in accordance with the invention.

FIG. 7 presents a flow chart of process steps by which etching of charged-particle tracks is employed to create apertures in a solid polycarbonate film or layer made by the process of FIG. 3. The track-etching uniformity is greatly improved when the polycarbonate layer has the microstructure of the leathery state (largely no short-range or long-range molecular ordering) compared to when the polycarbonate is in the glassy state with some short-range molecular ordering. Block 62 in FIG. 7 basically repeats block 29 of FIG. 3 for converting the solid polycarbonate layer from the glassy state to a hard solid having the microstructure of the leathery state.

The polycarbonate layer and the underlying substructure are now subjected to a beam of energetic charged particles that strike the top of the polycarbonate layer in a direction generally perpendicular to the upper polycarbonate surface. The charged particles have sufficient energy to pass through the polycarbonate layer and form straight tracks at random locations across the layer. See block 64. The charged-particle tracks constitute damaged polycarbonate zones along the particle paths. More particularly, each charged particle track consists of a highly damaged core surrounded by a less damaged region that transitions into undamaged polycarbonate. The highly damaged polycarbonate core of each charged-particle track is typically 4–10 nm in diameter.

The charged-particle tracks extend substantially parallel to one another. Although the charged-particle tracks are randomly located across the polycarbonate track (or track-forming) layer, the tracks have a well-defined average spacing. For an average track spacing of 1 $\mu$m, the track density is approximately $10^8$ tracks/cm$^2$.

A charged-particle accelerator that forms a well-collimated beam of ions is utilized to form the charged-particle tracks. The ion beam is scanned uniformly across the top of the polycarbonate layer. Preferably, the charged-particle species is singly ionized argon ($Ar^+$) at an energy of 2 MeV. The charged-particle species can alternatively be quadruply ionized xenon ($Xe^{4+}$) at an energy of 16 MeV. The charged-particle tracks can also be created from a collimated source of nuclear fission particles produced, for example, from the radioactive element Californium 252.

An operation that improves the wetting characteristics of the upper surface of the polycarbonate track layer is usually performed at this point. See block 66. In particular, the chemical nature of the polycarbonate layer along its upper surface is changed so that the wetting characteristics are substantially uniform along the entire upper polycarbonate surface. This facilitates later etching along the charged-particle tracks to form apertures through the track layer, and thereby results in more uniform apertures.

The operation to improve the wetting characteristics is typically performed by subjecting the polycarbonate layer to a plasma to remove a selected thickness of the polycarbonate layer along its upper surface. The plasma is preferably an oxygen plasma at a power in the vicinity of 100 W. With the polycarbonate layer and underlying structure situated on a platen at 60° C., the polycarbonate layer is preferably subjected to the oxygen plasma for 20 s to remove approximately 30 nm of polycarbonate.

An operation that modifies the chemical properties of the polycarbonate track layer can also be performed on the track layer to help reduce the time needed to create the apertures through the polycarbonate along the charged-particle tracks. Typically, this operation entails exposing the polycarbonate to ultraviolet light. Alternatively, the polycarbonate can be exposed to ozone.

An etch is now performed along the charged-particle tracks to create straight parallel apertures through the polycarbonate track layer as indicated in block 68. In particular, the damaged polycarbonate material which forms the tracks is removed by bringing the polycarbonate layer into contact with a suitable chemical etchant, typically a solution of potassium hydroxide, that attacks the damaged polycarbonate much more than the undamaged polycarbonate. The etchant preferably does not significantly attack the substructure underlying the polycarbonate layer.

The etchant is normally at an elevated temperature during the polycarbonate etch. As part of the etch procedure, the polycarbonate (including the underlying substructure) is preferably raised to approximately the same temperature as the etchant. This is done to avoid thermal shock, to avoid changing the temperature of the etchant, and to provide better control over the temperature-dependent etch rate. When a potassium hydroxide solution is employed to etch the damaged material along the charged-particle tracks, the etchant/polycarbonate temperature is typically 35° C.

The highly damaged polycarbonate cores, again typically 4–10 nm in diameter, of the charged-particle tracks are removed rapidly during the etch, normally without significant etching of exposed undamaged polycarbonate. The etch rate selectivity of the highly damaged polycarbonate cores to the undamaged polycarbonate is very high, typically on the order of 10,000 to 1. The etch is continued into the lesser damaged polycarbonate regions surrounding the highly damaged cores, and typically through the lesser damaged regions into the surrounding undamaged polycarbonate as the lateral etch rate progressively drops to that of undamaged polycarbonate. The apertures formed through the polycarbonate layer along the charged-particle tracks normally reach an average diameter of 0.1–2.0 $\mu$m, typically 0.12–0.16 $\mu$m.

Some of the polycarbonate along the upper surface of the track layer is removed during the etch process, especially during the etching of the lesser damaged and undamaged polycarbonate material. As a result, the thickness of the polycarbonate layer is reduced. In general, to get a desired final track layer thickness, the thickness of the track layer directly after the plasma operation to improve the wetting characteristics must exceed the desired final track layer thickness by approximately 50% of the desired diameter of the apertures through the polycarbonate layer. For example, a 500-nm post-plasma polycarbonate track layer thickness is needed to achieve a 400-nm final track layer thickness with 200-nm apertures.

The entire polycarbonate etch to form the apertures along the charged-particle tracks is normally performed with the same etchant. Alternatively, the etching of the lesser damaged polycarbonate regions and the undamaged polycarbonate surrounding the lesser damaged regions can be performed with a different etchant than that used to remove the highly damaged cores of the charged-particle tracks. In any case, the etch occurs in a substantially uniform manner in the lateral direction—i.e., perpendicular to the charged-particle tracks. Accordingly, the final straight parallel apertures through the polycarbonate layer are respectively centered on the locations of the charged-particle tracks.

Figure 8A:
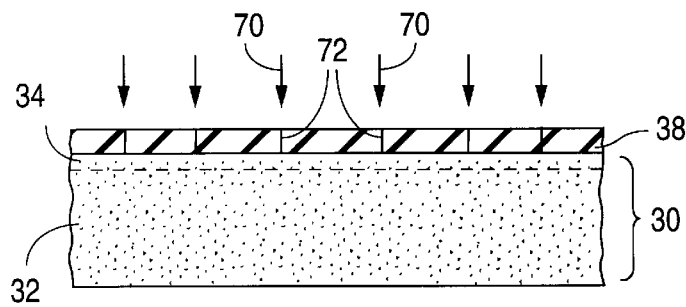
FIGS. 8a and 8b are cross-sectional views illustrating operations performable on the structure of FIG. 6d for providing a polycarbonate film with apertures according to the further processing steps of FIG. 7.
Figure 8B:
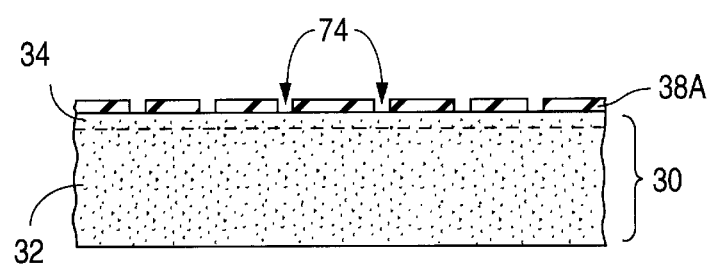

FIGS. 8a and 8b (collectively "FIG. 8") pictorially illustrate the formation and etching of the charged-particle tracks starting from the structure of FIG. 6d at a point subsequent to the drying operation and the transformation of solid polycarbonate film or layer 38 to a largely non-ordered microstructure. In FIG. 8a, charged particles 70 impinge perpendicularly on polycarbonate layer 38 to form charged-particle tracks 72 through layer 38. FIG. 8b illustrates the polycarbonate etch along charged-particle tracks 72 to create corresponding apertures 74 through layer 38. Item 38A in FIG. 8b is the reduced-thickness remainder of polycarbonate layer 38.

Electron Emitter Fabrication and Operation

In a typical application, track apertures 74 are employed in defining the locations for creating electron-emissive elements in an electron-emitting device suitable, for example, for a cathode ray tube of the flat-panel type. Apertures 74 can be utilized in a variety of ways to create electron-emissive elements. For example, see U.S. Pat. Nos. 5,559,389 and 5,564,959. The contents of both of these U.S. patents are incorporated by reference herein.

Figure 9A:
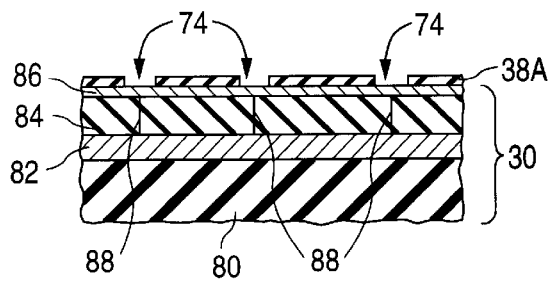
FIGS. 9a, 9b and 9c are cross-sectional views illustrating part of the steps by which an electron-emitting device is created from the structure of FIG. 8b in accordance with the invention.
Figure 9B:
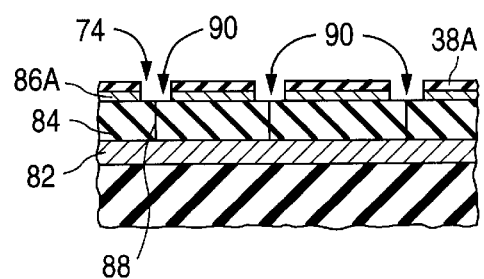
Figure 9C:
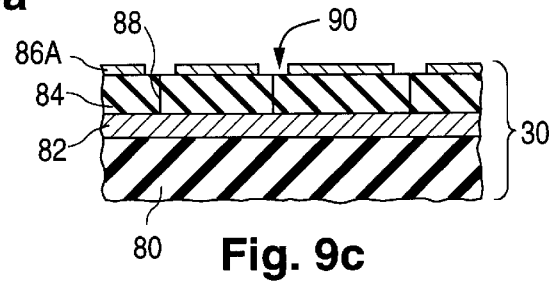

Electron-emissive elements can be formed directly in apertures 74, polycarbonate layer 38A thereby typically serving as an inter-electrode dielectric in a gated electron emitter. Alternatively, apertures 74 can be used to define openings in an underlying gate electrode layer for a gated electron emitter. FIGS. 9a–9c (collectively "FIG. 9") illustrate part of the steps in an example of the latter fabrication process.

Substructure 30 in the process of FIG. 9 consists of a substrate 80, a lower electrically non-insulating emitter region 82, an electrically insulating layer 84, and an electrically non-insulating gate electrode layer 86 as indicated in FIG. 9a. Substrate 80 is formed with electrically insulating material, at least along its upper surface. Although not explicitly depicted in FIG. 9a, lower non-insulating emitter region 82 preferably consists of a lower electrically conductive layer, typically metal, and an upper electrically resistive layer. At least the lower conductive layer is typically patterned into a group of parallel emitter-electrode lines referred to as row electrodes. When emitter region 82 is configured in this way, the final field-emission structure is particularly suitable for selectively exciting phosphors in a flat-panel display. Nonetheless, region 82 can be arranged in various other patterns, or can even be unpatterned.

Depending on considerations such as the desired shape of the electron-emissive elements (e.g., conical or filamentary), it may or may not be necessary (or advantageous) to provide inter-electrode dielectric layer 84 with charged-particle tracks corresponding to tracks 72 in track layer 38A.

If there is no need to provide dielectric layer 84 with such tracks, candidate materials for dielectric layer 84 range from (a) electrical insulators which are trackable—i.e., readily provide straight parallel charged-particle tracks when suitably bombarded with charged particles—and for which etchants having a high damaged-material-to-undamaged-material etch selectivity are available to (b) electrical insulators which are substantially non-trackable or/and for which etchants that provide high damaged-material-to-undamaged-material are not readily available. For example, in such a case, the electric layer 84 typically consists of silicon oxide deposited by chemical vapor deposition. While silicon oxide is relatively trackable, it is difficult to etch parallel straight apertures through silicon oxide along charge-particle tracks.

If it is necessary (or desirable) to provide inter-electrode dielectric layer 84 with such tracks, dielectric layer 84 is typically formed with an electrical insulator, such as polycarbonate, which is trackable and for which an etchant (e.g., a potassium hydroxide solution) that provides a high damaged-material-to-undamaged-material etch selectivity is available. FIG. 9a depicts this case. The charged particles which produced tracks 72 in polycarbonate track layer 38 (now track layer 38A) then also produce corresponding charged-particle tracks 88 through insulating layer 84. Each charged-particle track 88 was in line with corresponding charged-particle track 72 and thus now centers on corresponding aperture 74.

Gate electrode layer 86 typically consists of metal such as chromium or tantalum. Gate layer 86 may be patterned into a group of gate lines running perpendicular to the emitter row electrodes of lower non-insulating region 82. The gate lines then serve as column electrodes. With suitable patterning being applied to gate layer 86, the field emitter may alternatively be provided with separate column electrodes that contact portions of gate layer 86 and extend perpendicular to the row electrodes. This gate patterning and (when included) column-electrode formation may be done prior to the stage shown in FIG. 9a or at a later point in the fabrication process.

In a typical procedure for patterning gate layer 86 and providing separate column electrodes, the following steps are performed prior to the stage shown in FIG. 9a. A blanket layer of a column metal such as chromium or nickel is deposited on top of inter-electrode dielectric layer 84. The column metal is typically nickel deposited to a thickness of 15–250 nm. Using a suitable photoresist mask, the column metal is patterned into laterally separated parallel column electrodes. In patterning the column metal, openings are also formed through the column electrodes at the desired locations for gate portions that are to contact dielectric layer 84.

Next, a blanket layer of gate metal is deposited on top of the structure, including into the openings in the column electrodes. The gate metal is typically chromium deposited to a thickness of 20–50 nm. Using a suitable photomask, the gate metal is patterned to produce gate electrode layer 86. The gate metal removed during this step includes portions corresponding to the column metal portions removed to define the outer edges of the column electrodes. Apertures 74 in polycarbonate track layer 38 are then formed utilizing the charged-particle track formation/etching procedure described above to produce the structure of FIG. 9a.

Using polycarbonate track layer 38A as an etch mask, gate electrode layer 86 is etched through apertures 74 to form corresponding openings 90 through gate electrode 86. FIG. 9b depicts the structure at this point. Item 86A is the remainder of gate layer 86. Each gate opening 90 is in line with corresponding aperture 74 in track layer 38A. For the exemplary case in which the etch is performed anisotropically, each gate opening 90 is approximately the same size as corresponding aperture 74. The gate-layer etch is typically performed with a high-density plasma according to the procedure disclosed in Brigham et al, U.S. patent application Ser. No. 08/808,364, cited above.

Polycarbonate layer 38A is removed at some point in the process. The latest point for removing layer 38A depends on how gate electrode 86A is utilized and processed. FIG. 9c illustrates the typical case in which track layer 38A is removed directly after forming gate openings 90.

Figure 10A:
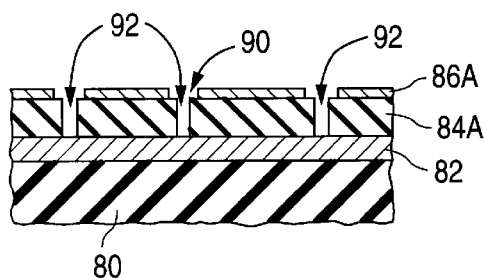
FIGS. 10a 10b and 10c are cross-sectional views illustrating a sequence of steps that utilize the invention's teaching for creating a gated electron-emitting device from the structure of FIG. 9c.
Figure 11A:
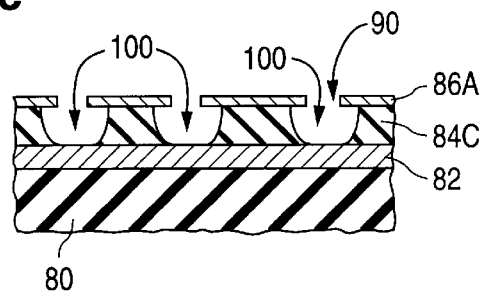
FIGS. 11a, 11b and 11c are cross-sectional views illustrating another sequence of steps that utilize the invention's teaching for creating a gated electron-emitting device from the structure of FIG. 9c.
Figure 10B:
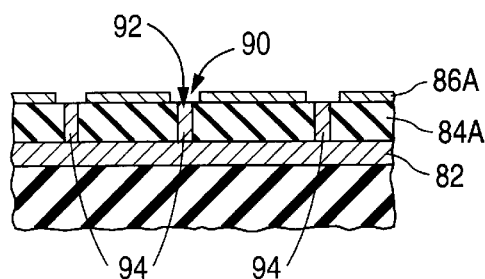
Figure 11B:
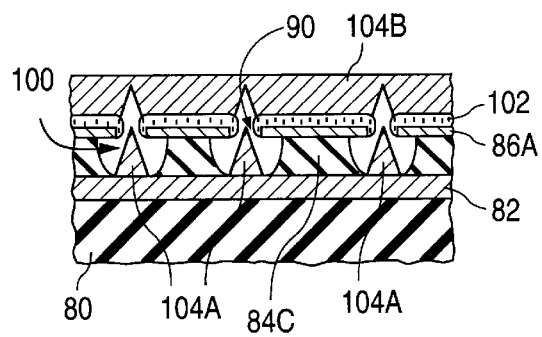
Figure 10C:
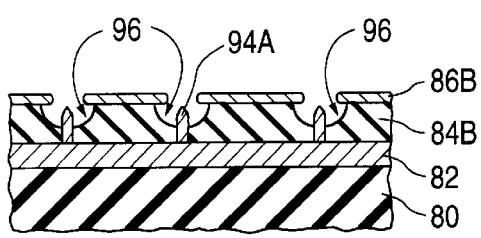
Figure 11C:
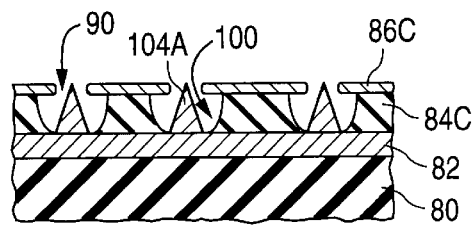

The structure of FIG. 9c can be employed to form electron-emissive elements of various shapes. FIGS. 10a–10c (collectively "FIG. 10") illustrate how filamentary electron-emissive elements are created from the structure of FIG. 9c. FIGS. 11a–11c (collectively "FIG. 11") present an example in which the structure of FIG. 9c is utilized to create conical electron-emissive elements. The following material presents a brief description of the steps for creating filamentary and conical electron-emissive elements according to the further steps of FIGS. 10 and 11. Additional information is given in U.S. Pat. Nos. 5,559,389 and 5,564,959, cited above.

Referring to the processing steps of FIG. 10, an etch is performed along charged-particle tracks 88 to produce pores 92 through inter-electrode dielectric layer 84. The average diameter of pores 92 is considerably less than the average diameter of apertures 74 through track layer 38A. When insulating layer 84 consists of polycarbonate, pores 92 can be created according to the same procedure used to create apertures 74, except that the polycarbonate etch is performed for a shorter duration. See FIG. 10a in which item 84A is the remainder of insulating layer 84.

Electrically non-insulating emitter filament material, typically metal, is electrochemically deposited into pores 92 to form corresponding electron-emissive filaments 94 that contact lower non-insulating region 82 as shown in FIG. 10b. Using patterned gate electrode layer 86A as an etch mask, the exposed portions of insulating track layer 84A are etched to form cavities 96 that respectively surround electron-emissive filaments 94. See FIG. 10c. The upper ends of filaments 94 are electropolished and sharpened to produce sharpened electron-emissive elements 94A.

Finally, the edges of gate electrode 86A may be rounded by performing an electropolishing step. FIG. 10c depicts the resultant structure for the case in which the electropolishing step is performed on gate electrode 86A. Items 84B and 86B are the respective remainders of polycarbonate track layer 84A and patterned gate electrode 86A in the structure of FIG. 10c.

In the further processing steps of FIG. 11, patterned gate layer 86A is used as an etch mask for etching the portions of insulating layer 84 exposed through gate openings 90 to form corresponding dielectric open spaces (or cavities) 100 as shown in FIG. 11a. The etch typically consists of a plasma etch step followed by a chemical etch step. Each dielectric open space 100 extends down to lower non-insulating region 82 and is vertically aligned with corresponding gate opening 90. Item 84C in FIG. 11a is the remainder of inter-electrode insulating layer 84.

A lift-off layer 102 is formed on gate layer 86A by evaporatively depositing a suitable lift-off material such as aluminum at a low angle, typically in the vicinity of 15–30°, relative to the upper surface of gate layer 86A. See FIG. 11b. Electrically non-insulating emitter cone material, typically a metal such as molybdenum, is evaporatively deposited on top of lift-off layer 102 and through gate openings 90 into dielectric open spaces 100. The cone material deposition is typically performed approximately perpendicular to the upper surface of gate layer 86A.

As the emitter cone material accumulates on lift-off layer 102, the openings through which the cone material enters dielectric open spaces 100 progressively close. The cone material deposition is performed for a time sufficiently long to achieve full closure. The cone material thereby forms conical electron-emissive elements 104A respectively in dielectric open spaces 100. A continuous layer 104B of the cone material simultaneously accumulates on top of the structure as shown in FIG. 11b.

A lift-off etch is performed, typically with a chemical etchant, to remove lift-off layer 102 and overlying cone-material layer 104B. The edges of gate electrode 86B can be electropolished to round the gate edges. FIG. 11c shows the resultant structure for the case in which the electropolishing step is performed. Item 86C is the remainder of gate electrode 86B. Each conical electron-emissive element 104A is approximately centered in corresponding dielectric open space 100 and extends close to corresponding gate opening 90, preferably protruding into the center of corresponding opening 90.

Figure 12:
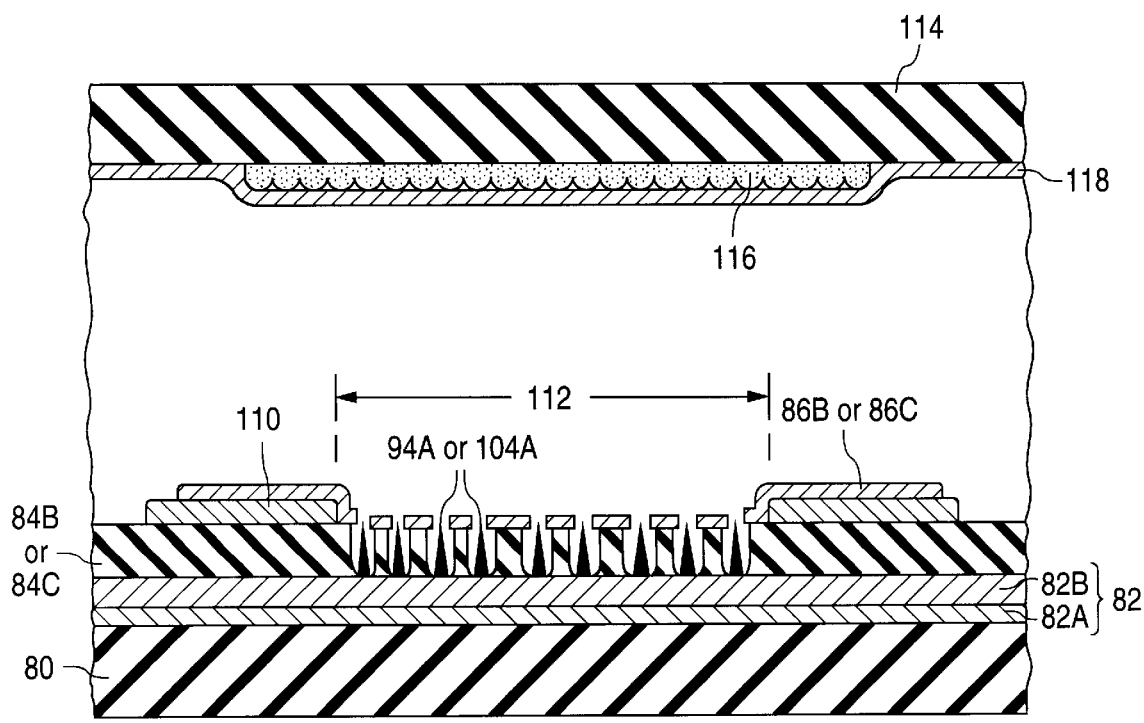
FIG. 12 is a cross-sectional view of a flat-panel CRT display that incorporates a gated field emitter, such as that of FIG. 10c or 11c, fabricated according to the invention.

FIG. 12 depicts a typical example of the core active region of a flat-panel CRT display that employs an area field emitter, such as that of FIG. 10c or 11c, manufactured according to the invention. Substrate 80 forms the backplate for the CRT display. Lower non-insulating region 82 is situated along the interior surface of backplate 80 and consists of electrically conductive layer 82A and overlying electrically resistive layer 82B.

Column electrodes 110, which extend perpendicular to the plane of FIG. 12, underlie portions of gate layer 86B or 86C. One column electrode 110 is depicted in FIG. 12. Column-electrode apertures 112, one of which is shown in FIG. 12, extend through column electrodes 110. Each column-electrode aperture 112 exposes a multiplicity of electron-emissive elements 94A or 104A.

A transparent, typically glass, faceplate 114 is located across from backplate 80. Light-emitting phosphor regions 116, one of which is shown in FIG. 12, are situated on the interior surface of faceplate 114 directly across from corresponding column-electrode aperture 112. A thin light-reflective layer 118, typically aluminum, overlies phosphor regions 116 along the interior surface of faceplate 114. Electrons emitted by electron-emissive elements 94A or 104A pass through light-reflective layer 118 and cause phosphor regions 116 to emit light that produces an image visible on the exterior surface of faceplate 114.

The core active region of the flat-panel CRT display typically includes other components not shown in FIG. 12. For example, a black matrix situated along the interior surface of faceplate 114 typically surrounds each phosphor region 116 to laterally separate it from other phosphor regions 116. Focusing ridges provided over interelectrode dielectric layer 84B or 84C help control the electron trajectories. Spacer walls are typically utilized to maintain a relatively constant spacing between backplate 80 and faceplate 114.

When incorporated into a flat-panel display of the type illustrated in FIG. 12, a field emitter manufactured according to the invention operates in the following way. Light-reflective layer 118 serves as an anode for the field-emission cathode. The anode is maintained at high positive voltage relative to the gate and emitter lines.

When a suitable voltage is applied between (a) a selected one of the emitter row electrodes in lower non-insulating region 82 and (b) a selected one of the column electrodes that are formed with or contact portions of gate layer 86B or 86C, the so-selected gate portion extracts electrons from the electron-emissive elements at the intersection of the two selected electrodes and controls the magnitude of the resulting electron current. Desired levels of electron emission typically occur when the applied gate-to-cathode parallel-plate electric field reaches 20 V/$\mu$m or less at a current density of 0.1 mA/cm$^2$ as measured at the phosphor-coated faceplate in a flat-panel CRT display when phosphor regions 116 are high-voltage phosphors. Upon being hit by the extracted electrons, phosphor regions 116 emit light.

Variations

Directional terms such as "lower" and "upper" have been employed in describing the present invention to establish a frame of reference by which the reader can more easily understand how the various parts of the invention fit together. In actual practice, the components of a field emitter may be situated at orientations different from that implied by the directional terms used here. The same applies to the ways in which the fabrication steps are performed in the invention. Inasmuch as directional terms are used for convenience to facilitate the description, the invention encompasses implementations in which the orientations differ from those strictly covered by the directional terms employed here.

The various electron-emissive elements and charged-particle tracks (or track segments) have longitudinal axes (not shown). Each electron-emissive element is generally symmetric about its longitudinal axis. A reference to an etch as being performed along a charged-particle track through a track layer means that the removed material occupies a volume containing at least part of the track's longitudinal axis in the track layer.

While the invention has been described with reference to particular embodiments, this description is solely for the purpose of illustration and is not to be construed as limiting the scope of the invention claimed below. For example, the process flow of FIGS. 3 and 6 can be modified in various ways. Instead of forming liquid film 36A by spin coating part of the liquid chemical formulation over substructure 30, film 36A can be created by dipping substructure 30 into the formulation to form the liquid film. Alternatively, film 36A may be created by meniscus coating, by extrusion, by spraying, or by spreading the liquid using a doctor blade or similar device.

Certain polycarbonate solvents generally suitable for use in the present liquid chemical formulation oxidize to an unacceptable degree during storage of the formulation, thereby reducing the useful storage life of the formulation. 1-methylpyrrolidinone (NMP) is such an oxidizable polycarbonate solvent. Oxidation typically occurs due to the formation of free radicals when the formulation is exposed to oxygen or a reactive metal surface.

A stabilizer—e.g., 4-tert-butylcatechol or quinone in the case of 1-methylpyrrolidinone—can be employed in the present polycarbonate-containing liquid chemical formulation to inhibit oxidation of the polycarbonate solvent. The stabilizer typically operates by acting preferentially with the free radicals to form stable unreactive products. The stabilizer is employed at a low concentration, typically less than 0.0001% by mass (100 parts per million) of the formulation, and thus constitutes a minor component of the formulation.

The polycarbonate-dissolving liquid chemical formulation used in the process of the invention may, as indicated above be formed with two or more polycarbonate solvents. A multiple-solvent formulation can be utilized to improve the polycarbonate film-forming properties in extrusion coating applications or in making polycarbonate films of large surface area. All of the polycarbonate solvent candidates described above can be employed in multiple-solvent formulations.

In a two-solvent formulation, the solvent mix percentage for each solvent can vary from less than 1% by mass of the formulation to more than 99% by mass of the formulation. For example, a two-solvent formulation may contain 1 part of pyridine to 2 parts 1-methylpyrrolidinone.

Two or more polycarbonates can similarly be employed to form the polycarbonate material in the present liquid chemical formulation. This includes polycarbonates with the same repeating unit but different molecular weights.

In the process sequence of FIG. 11, the formation of lift-off layer 102 could be deleted. By appropriately choosing the cone and gate materials, cone-material layer 104B could be electrochemically removed by using the technique disclosed in Spindt et al, U.S. patent application Ser. No. 08/610,729, filed Mar. 5, 1996.

Substrate 40 could be deleted if lower non-insulating region 42 is a continuous layer of sufficient thickness to support the structure. Insulating substrate 40 could be replaced with a composite substrate in which a thin insulating layer overlies a relatively thick non-insulating layer that furnishes structural support.

The electron emitters produced according to the invention could be employed to make flat-panel devices other than flat-panel CRT displays. Various modifications and applications may thus be made by those skilled in the art without departing from the true scope and spirit of the invention as defined by the appended claims.

We claim:

1. A method comprising the steps of:

providing a liquid chemical formulation that comprises: polycarbonate material; and
a liquid (a) capable of dissolving the polycarbonate material to a concentration of at least 1% by mass of the formulation at 20° C. and 1 atmosphere and (b) having a boiling point of at least 80° C. at 1 atmosphere;

forming a liquid layer of the formulation over a substructure;

processing the liquid layer to largely remove the liquid and convert the liquid layer into a solid track layer;

causing charged particles to pass into the track layer to form a multiplicity of charged-particle tracks at least partway therethrough; and creating corresponding apertures at least partway through the track layer by a procedure that entails etching the track layer along the charged-particle tracks.

2. A method as in claim 1 wherein the liquid consists largely of pyridine.

3. A method as in claim 1 wherein the polycarbonate material has a glass transition of at least 65° C.

4. A method as in claim 1 wherein the boiling point of the liquid is no more than ($T_g$+15° C.) at 0.001 atmosphere, where $T_g$ is the glass transition temperature of the polycarbonate material.

5. A method as in claim 1 wherein the protonated form of the liquid in aqueous solution has an acid dissociation constant greater than $10^{-8}$ at 20° C. and 1 atmosphere.

6. A method as in claim 1 wherein the formulation has a kinematic viscosity of no more than 100 centistokes at 20° C. and 1 atmosphere.

7. A method as in claim 1 wherein the apertures extend generally parallel to one another.

8. A method as in claim 1 wherein the apertures pass substantially through the track layer.

9. A method as in claim 8 wherein the forming step comprises spin coating at least part of the formulation over the substructure.

10. A method as in claim 8 wherein the processing step comprises drying the liquid layer.

11. A method as in claim 8 wherein the processing step includes converting the polycarbonate material from a glass-like microstructure having some short-range molecular ordering to a microstructure having largely no short-range or long-range molecular ordering.

12. A method as in claim 8 wherein the substructure comprises an electrically non-insulating layer, the method further including the step of etching the non-insulating layer through the apertures to form corresponding openings in the non-insulating layer.

13. A method as in claim 12 further including the step of defining electron-emissive elements respectively centered approximately on the openings in the non-insulating layer.

14. A method as in claim 13 wherein (a) the non-insulating layer comprises a gate layer, (b) an electrically insulating layer is provided below the gate layer, and (c) a lower electrically non-insulating emitter region is provided below the insulating layer, the defining step comprising:

etching the insulating layer through the openings in the gate layer to form corresponding dielectric open spaces through the insulating layer down to the emitter region; and forming electron-emissive elements in the dielectric open spaces so as to contact the emitter region.

15. A method as in claim 14 wherein the gate layer serves as an etch mask during the etching step.

16. A method as in claim 14 wherein the electron-emissive elements are generally in the shape of filaments.

17. A method as in claim 14 wherein the electron-emissive elements are generally conical.

18. A method as in claim 1 wherein the liquid comprises at least one of pyridine, a ring-substituted pyridine derivative, pyrrole, a ring-substituted pyrrole derivative, pyrrolidine, a pyrrolidine derivative, chlorobenzene, and cyclohexanone.

19. A method as in claim 1 wherein the providing step includes drying the polycarbonate material and/or the liquid to remove water.

20. A method as in claim 1 wherein the providing step comprises combining the liquid and the polycarbonate material in a substantially water-free environment.

21. A method as in claim 1 wherein the providing step includes providing the liquid formulation with a surfactant.

22. A method as in claim 1 wherein the providing step includes providing the liquid formulation with an adhesive or an adhesion promoter.

23. A method as in claim 1 wherein the solid track layer consists largely of polycarbonate.

24. A method comprising the steps of:

providing a liquid chemical formulation that comprises (a) polycarbonate material and (b) a liquid comprising at least one of pyridine, a ring-substituted pyridine derivative, pyrrole, a ring-substituted pyrrole derivative, pyrrolidine, a pyrrolidine derivative, chlorobenzene, and cyclohexanone;

forming a liquid layer of the formulation over a substructure;

processing the liquid layer to largely remove the liquid and convert the liquid layer into a solid track layer;

causing charged particles to pass into the track layer to form a multiplicity of charged-particle tracks at least partway therethrough; and creating corresponding apertures at least partway through the track layer by a procedure that entails etching the track layer along the charged-particle tracks.

25. A method as in claim 19 wherein the apertures pass substantially through the track layer.

26. A method as in claim 25 wherein the processing step includes converting the polycarbonate material from a glass-like microstructure having some short-range molecular ordering to a microstructure having largely no short-range or long-range molecular ordering.

27. A method as in claim 25 wherein the substructure comprises an electrically non-insulating layer, the method further including the step of etching the non-insulating layer through the apertures to form corresponding openings in the non-insulating layer.

28. A method as in claim 27 further including the step of defining electron-emissive elements respectively centered approximately on the openings in the non-insulating layer.

29. A method as in claim 25 wherein (a) the non-insulating layer comprises a gate layer, (b) an electrically insulating layer is provided below the gate layer, and (c) a lower electrically non-insulating emitter region is provided below the insulating layer, the defining step comprising:

etching the insulating layer through the openings in the gate layer to form corresponding dielectric open spaces through the insulating layer down to the emitter region; and forming electron-emissive elements in the dielectric open spaces so as to contact the emitter region.

30. A method as in claim 24 wherein both pyridine and the pyridine derivative are representable as:

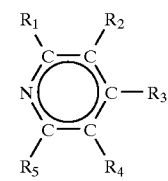

where:

N is nitrogen;

C is carbon; and each of $R_1$, $R_2$, $R_3$, $R_4$, and $R_5$ is a monovalent covalent substituent.

31. A method as in claim 24 wherein both pyrrole and the pyrrole derivative are representable as:

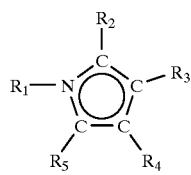

where:

N is a nitrogen atom;

C is a carbon atom; and each of $R_1$, $R_2$, $R_3$, $R_4$, and $R_5$ is a monovalent covalent substituent.

32. A method as in claim 24 wherein both pyrrolidine and the pyrrolidine derivative are generally representable as:

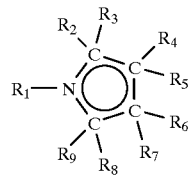

where:

N is a nitrogen atom;

C is a carbon atom; and each of $R_1$, $R_2$, $R_3$, $R_4$, $R_5$, $R_6$, $R_7$, $R_8$, and $R_9$ is a monovalent covalent substituent subject to any pair of $R_2$–$R_9$ on any of the carbon atoms being replaced with a single bivalent substituent double covalently bonded to that carbon atom, or/and up to one pair of $R_2$–$R_9$ on an adjacent pair of carbon atoms being replaced with a covalent bond between that pair of carbon atoms to create a double covalent bond therebetween, or/and $R_1$ and $R_2$ being replaced with a covalent bond between the nitrogen atom and the carbon atom bonded to $R_2$ to create a double covalent bond therebetween.

33. A method as in claim 24 wherein the liquid comprises at least one of chlorobenzene and cyclohexanone.

34. A method as in claim 24 wherein the polycarbonate material is representable as:

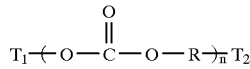

where:

O is an oxygen atom;

C is a carbon atom;

R is a bivalent group;

each of $T_1$ and $T_2$ is a terminating group;

n is a plural integer; and

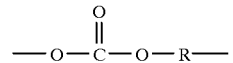

is a monomeric repeating unit repeated n times.

35. A method as in claim 24 wherein the solid track layer consists largely of polycarbonate.

36. A method comprising the steps of:

providing a liquid chemical formulation that comprises:
  polycarbonate material;
  a liquid capable of dissolving the polycarbonate material to a concentration of at least 1% by mass of the formulation at 20° C. and 1 atmosphere; and
  a surfactant;

forming a liquid layer of the formulation over a substructure;

processing the liquid layer to largely remove the liquid and convert the liquid layer into a solid track layer;

causing charged particles to pass into the track layer to form a multiplicity of charged-particle tracks at least partway therethrough; and creating corresponding apertures at least partway through the track layer by a procedure that entails etching the track layer along the charged-particle tracks.

37. A method comprising the steps of:

providing a liquid chemical formulation that comprises:
  polycarbonate material;
  a liquid capable of dissolving the polycarbonate material to a concentration of at least 1% by mass of the formulation at 20° C. and 1 atmosphere; and
  an adhesive or adhesion promoter;

forming a liquid layer of the formulation over a substructure;

processing the liquid layer to largely remove the liquid and convert the liquid layer into a solid track layer;

causing charged particles to pass into the track layer to form a multiplicity of charged-particle tracks at least partway therethrough; and creating corresponding apertures at least partway through the track layer by a procedure that entails etching the track layer along the charged-particle tracks.

* * * * *